US012773632B2

(12) United States Patent
Quinn et al.

(10) Patent No.: US 12,773,632 B2
(45) Date of Patent: Oct. 27, 2026

(54) SYSTEM AND METHOD FOR PROVIDING VIRTUAL SPORTS CARDS AND SYSTEM AND METHOD FOR PROVIDING A GAME USING VIRTUAL SPORTS CARDS

(71) Applicant: RSI IP Holding, LLC, Chicago, IL (US)

(72) Inventors: Daniel Henderson Quinn, Paso Robles, CA (US); Lennon Michael Landry, Oakville (CA); Timothy James Whitehead, Richmond (CA)

(73) Assignee: RSI IP HOLDING, LLC, Chicago, IL (US)

( * ) Notice: Subject to any disclaimer, the term of this patent is extended or adjusted under 35 U.S.C. 154(b) by 173 days.

(21) Appl. No.: 18/918,888

(22) Filed: Oct. 17, 2024

(65) Prior Publication Data

US 2026/0108811 A1 Apr. 23, 2026

(51) Int. Cl.
*A63F 13/537* (2014.01)
*A63F 13/828* (2014.01)

(52) U.S. Cl.
CPC .......... *A63F 13/537* (2014.09); *A63F 13/828* (2014.09)

(58) Field of Classification Search
None
See application file for complete search history.

(56) References Cited

U.S. PATENT DOCUMENTS

| | | | | |
|---|---|---|---|---|
| 12,400,524 | B2 * | 8/2025 | Givant | G07F 17/3209 |
| 2003/0037075 | A1 | 2/2003 | Hannigan et al. | |
| 2022/0383303 | A1 * | 12/2022 | Mullen | G06Q 20/389 |
| 2024/0070327 | A1 | 2/2024 | Monadjem | |

* cited by examiner

*Primary Examiner* — Stephen T. Reed
(74) *Attorney, Agent, or Firm* — BakerHostetler

(57) ABSTRACT

System and method for providing virtual player cards and/or a game using virtual playing cards. The virtual player cards have an associated target statistic and a base award. The virtual player card is generated by the steps of randomly selecting a player from a plurality of available players, randomly selecting a level from a plurality of predetermined level, establishing a player card award as a function of the randomly determined level and the base award, and assigning the randomly determined player, the randomly determined level and the player card award to the virtual player card.

32 Claims, 35 Drawing Sheets

50

50

50

50

50

50

50

50

50

50

36

38

SYSTEM AND METHOD FOR PROVIDING VIRTUAL SPORTS CARDS AND SYSTEM AND METHOD FOR PROVIDING A GAME USING VIRTUAL SPORTS CARDS

FIELD OF THE INVENTION

The invention relates generally to virtual sports cards, and more particularly to systems and methods for providing games using virtual sports cards.

BACKGROUND OF THE INVENTION

The popularity of social gaming and games that are played for real money and/or awards have exploded in recent years. One such type of game is fantasy sports, e.g., fantasy football. In such games, participants draft and manage a virtual football team from a pool of real-life athletes. In the drafting process, participants choose athletes in a predefined draft order. Athletes with "better" statistics are more desirable, so a participant's results in the game is dependent upon their drafted athletes and thus, in part, the participant's draft order.

Generally, since athletes with better statistics relative to other athletes are seen as more desirable, the excitement of the participants of the fantasy game will center around the more desirable or popular athletes. This may lessen the overall excitement in the fantasy game. The present invention is aimed at one or more of the problems identified above.

BRIEF SUMMARY OF THE INVENTION

In a first aspect of the present invention, a user interface component installed on a user device and configured to allow a user to interact with a virtual player card is provided. The virtual player card has a randomly selected player selected from a plurality of available players, a level randomly selected from a plurality of available levels and a player card award. The user interface component includes a plurality of user inputs and a display screen forming a user interface. The user interface is configured to display a graphical representation of the virtual player card on the display screen of the user interface. The graphical representation has a first mode and a second mode. The player, level and player card award are hidden in the first mode and the player, level and player card award are visible in the second mode, the user interface configured to perform the steps of displaying the graphical representation of the virtual player card in the first mode, detecting actuation of one of the user inputs by the user, and animating, in response to detecting actuation of one of the user inputs by the user, the graphical representation to reveal the second mode.

In a second aspect of the present invention, a method associated with an interface component installed on a user device and configured to allow a user to interact with a virtual player card is provided. The virtual player card has a randomly selected player selected from a plurality of available players, a level randomly selected from a plurality of available levels and a player card award. The user interface component includes a plurality of user inputs and a display screen forming a user interface. The user interface is configured to perform the steps of displaying a graphical representation of the virtual player card on the display screen in a first mode, detecting actuation of one of the user inputs by the user, and animating, in response to detecting actuation of one of the user inputs by the user, the graphical representation to reveal a second mode. The player, level and player card award are hidden in the first mode and are visible in the second mode.

In a third aspect of the present invention, a system including a user interface component installed on a user device and at least one server is provided. The user interface is configured to provide a user interface including a plurality of user inputs and a display screen. The at least one server in communication with the user interface component and includes one or more processors and a memory device for storing computer instructions. The one or more processors are configured to execute the computer instructions to perform the step of generating a virtual player card. The virtual player card has an associated target statistic and a base award. The virtual player card may be generated by performing the steps of randomly selecting a player from a plurality of available players, randomly selecting a level from a plurality of predetermined levels, and establishing a player card award as a function of the randomly determined level. The randomly determined player, the randomly determined level and the player card award may then be assigned to the virtual player card. The one or more processors are also configured to execute the computer instructions to perform the steps of storing the virtual player card in the memory device, providing the virtual player card to a user associated with the user device, and displaying a graphical representation of the virtual player card on the display screen of the user interface. The graphical representation has a first mode and a second mode. The player, level and player card award are hidden in the first mode and the player, level and player card award are visible in the second mode. The step of displaying a graphical representation of the virtual player on the display screen of the user interface includes the steps of displaying the graphical representation of the virtual player card in the first mode, detecting actuation of one of the user inputs by the user, and animating, in response to detecting actuation of one of the user inputs by the user, the graphical representation to reveal the second mode.

In a fourth aspect of the present invention, a method is provided. The method may be performed, at least in part, by at least one server having one or more processors and a memory device for storing computer instructions. The method includes steps of providing a user interface component installed on a user device and configured to provide a user interface and generating, by the at least one sever, a virtual player card. The user interface includes a plurality of user inputs and a display screen. The virtual player card having an associated target statistic and a base award. The virtual player card is generated by the steps of randomly selecting a player from a plurality of available players, randomly selecting a level from a plurality of predetermined levels, establishing a player card award as a function of the randomly determined level, and assigning the randomly determined player, the randomly determined level and the player card award to the virtual player card. The virtual player card is stored in the memory device. The method further includes the steps of providing the virtual player card to a user associated with the user device and displaying a graphical representation of the virtual player card on the display screen of the user interface. the graphical representation having a first mode and a second mode, wherein the player, level and player card award are hidden in the first mode and the player, level and player card award are visible in the second mode. The step of displaying a graphical representation of the virtual player on the display screen of the user interface includes the steps of displaying the graphical representation of the virtual player card in the first mode, detecting actuation of one of the user inputs by the user, and animating, in response to detecting actuation of one of the user inputs by the user, the graphical representation to reveal the second mode.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIGS. 9A-91 are screenshots of a mobile application or app associated with the system of FIG. 1 illustrating the presentation of virtual sports cards in a package, according to an embodiment of the present invention.

DETAILED DESCRIPTION OF THE INVENTION

Figure 1:
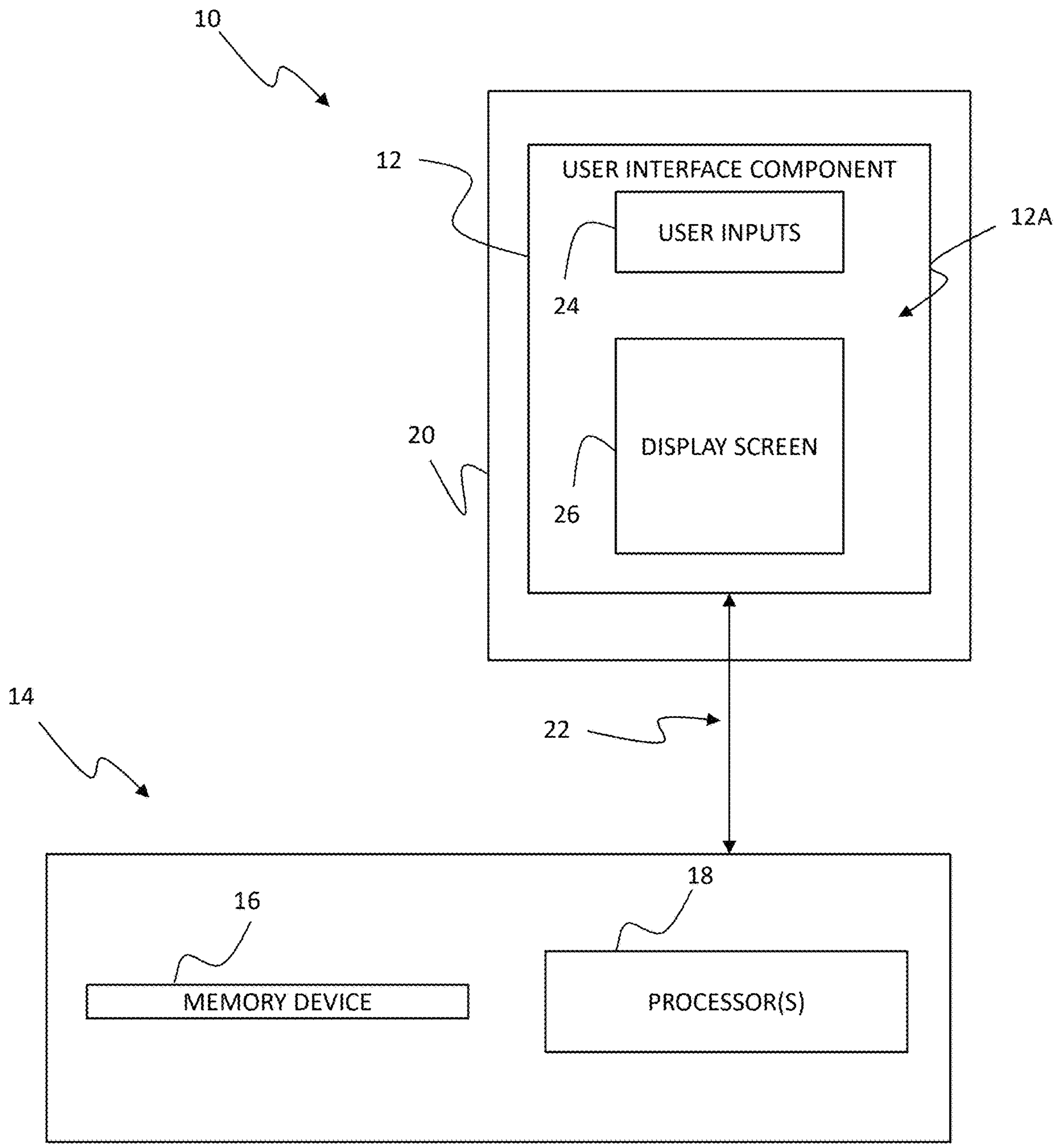
FIG. 1 is a block diagram of a system for providing virtual player cards, according to an embodiment of the present invention.

With reference to the drawings, and in operation, the present invention provides a system 10 and a method M10 for generating virtual sports cards 50 and/or providing a fantasy game using virtual sports cards 50. Each virtual sports card 50 has an associated target statistic, a player, a level, and a base award. Generally, the system 10 and method M10 may generate virtual sports cards 50 by randomly selecting a player from a plurality of available players and, independently, randomly select a level from a plurality of available levels.

The term "fantasy" game is used refer to any game played based on one or more of the virtual sports cards 50. Users may make wagers using real currency or virtual currency or points. At least some of the awards may be provided using real currency.

The term "target statistic" may be any available tracked or combination statistic associated with the selected player. As discussed in more detail below, the virtual sports card 50 may utilize a base award structure in which a user (to whom the virtual sports card 50 has been assigned) is awarded the base award for every instance of the target statistic achieved by the player, e.g., if the target statistic is points scored, the user is awarded the base award for every point scored by the player.

Alternatively, the virtual sports card 50 may utilize a target structure with one or more target statistics. Each of the target statistics may have an associated (base) award. A user (to whom the virtual sports card 50 has been assigned) may be awarded the base award when the associated target statistic has been achieved by the player.

In another aspect of the present invention, different players may have different types of target statistics and/or different target statistics. For example, of the target statistics is points scored, two different players may have different target statistics. Or the target statistic for one baseball player, for example, a fast baseball player, may be stolen bases and for a different baseball player, e.g., a slower player or a power hitter, the target statistic may be some other statistic, e.g., homeruns.

The virtual sports cards 50 issued for sports with ordered/ranked finishes may pay prizes associated with the player's finishing spot. For example, a golf card might pay out the grand prize if the golfer finishes first, a smaller prize for 2-5th place finish, etc. Similarly, a boxing card could pay out the grand prize if the boxer wins the fight+knocks out their opponent+exceeds a certain number of landed punches.

In one aspect of the present invention, the players are athletes that play a sport, typically, in a league or professional league. For example, the players could be all basketball players currently playing in the National Basketball Association (NBA).

When used in a fantasy game, any potential award may be affected by the actual player's performance and the level. Thus, players with higher expected performance, e.g., points per game, may be more desirable. As will be discussed in more detail below, in one aspect of the present invention, the player and the level for each virtual player card is independently randomly selected. As certain players may generally be expected to exhibit higher performance, such player may be more popular or desirable, the independent random selection of the level, which may affect any potential award, may make less "desirable" players more valuable. This dual-randomness feature adds interest and excitement to any fantasy game utilizing the virtual sports cards 50 of the present invention.

Basic Implementation of a Fantasy Game Using Virtual Sports Cards 50

In a basic implementation, the game provided by the system 10 or method M10, one or more virtual sports cards 50 are provided to a user. As discussed below, each virtual sports card has an assigned player, or athlete. The assigned player's actual statistic is used for the game. After the term (see below) is over, an award may be provided to the user to whom a virtual players card has been assigned based on the player's actual statistic during the term.

The award may be based on the player's actual statistic and the level assigned to the card. In one embodiment, the award is awarded to the user if the player's actual statistic exceeds an associated threshold level.

In a first example, the players may be basketball players and the plurality of available players are the players available for playing during the associated term, or length of the fantasy game. In this example, the associated term is one game. The target statistic associated with each card and the actual statistic may be any measurable statistic associated with the players, e.g., points made, rebounds, etc. . . . .

In the first example, the statistic may be points scored by the player. Generally, the associated target statistic, in this case, points scored, for each virtual player card is the same. The base award may be an award based on the actual number of points scored by the player during the game. For instance, the base award may be $1 (which may represent real or virtual currency), virtual points (which may be exchanged for other awards), and other types of awards. In the first embodiment, the base award is $1 for every point scored by the player during the term, i.e., game. As will be described in further detail below, the independent randomly selected level affects the potential award provided to the player. For example, in one embodiment, the level associated with a virtual sporting card is randomly selected from among: gold level, silver level, and bronze level.

Although three distinct levels are given here by way of example, it is contemplated that any suitable number of levels may be implemented in the fantasy game. In some embodiments, there may be only a single level. In some embodiments all players are eligible for the higher tier levels, while in other embodiments only a subset of players are eligible for the higher tier levels.

The term targeted statistic may also include may also include ordered/ranked finishes associated with the player's finishing spot. For example, a golf card might pay out the grand prize if the golfer finishes first, a smaller prize for 2-5th place finish, etc. Similarly, a boxing card could pay out the grand prize if the boxer wins the fight+knocks out their opponent+exceeds a certain number of landed punches.

Each virtual sports card 50 may have an associated randomly selected level. In the first example, the award associated with a virtual sports card 50 with the bronze level is equal to the base award, e.g., $1. Generally, the award associated with silver level virtual sports cards 50 is higher than the award associated with bronze level cards and the award associated with gold level virtual sports cards 50 is higher than the award associated with silver level virtual sports cards 50. In the first example, the award associated with silver level virtual sports cards 50 may be $2 per point scored and the award associated with gold level virtual sports cards may be $10 per point.

If the award associated with each card was the same, the virtual players card associated with the player with the higher point per game average would have a higher expected payout (or total award). However, if the virtual players card associated with the player with a lower point per game average has a higher level, for example, gold vs. bronze, and thus, a higher potential award, such a card may be more desirable. This may drive interest in other players rather than just "high" performers. This may result in driving interest in lower performing players and increasing excitement in the overall fantasy game.

In other embodiments, each virtual sports cards may have tier award levels. Each tier award level may have one or more associated statistic threshold and an associated award. For example, in one embodiment, each virtual sports card has 4 points-scored tier levels of 20+, 30+, 40+ and 50+ points per game with increasing valuable potential awards. The potential awards may also be affected or increased based on the randomly selected level. In these embodiments, if/when the player's actual statistic exceeds the associated target statistic of one of the tiers of the virtual players card provided to the user, the user is awarded the base award as modified by the randomly selected level of the virtual players card.

The predetermined term may be a single sports game, a predetermined number of games, e.g., x games, a time period, e.g., a week or a month, a series of games, e.g., subsequent games between the same two teams, a season, or a career.

Figure 2A:
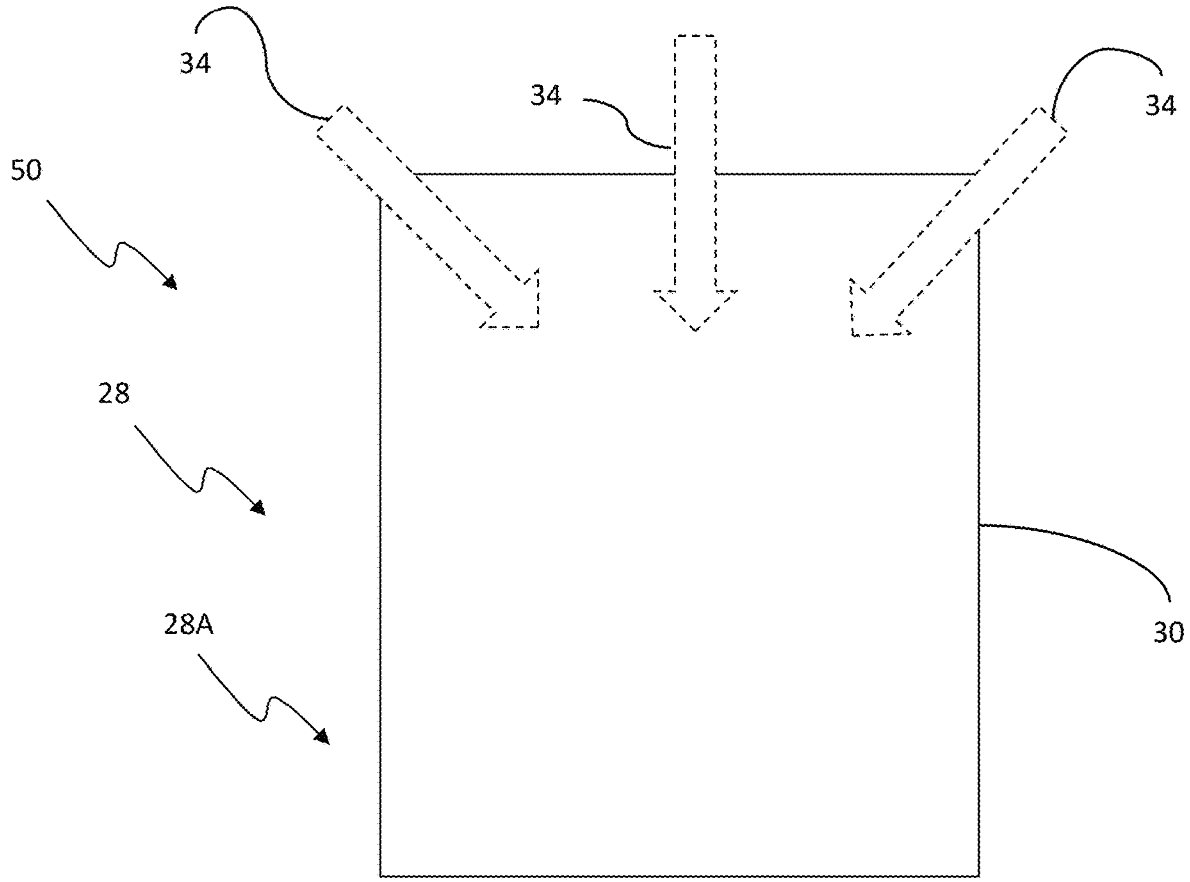
FIG. 2A is a simplified graphical representation of a virtual player card in a first mode, according to an embodiment of the present invention.
Figure 2B:
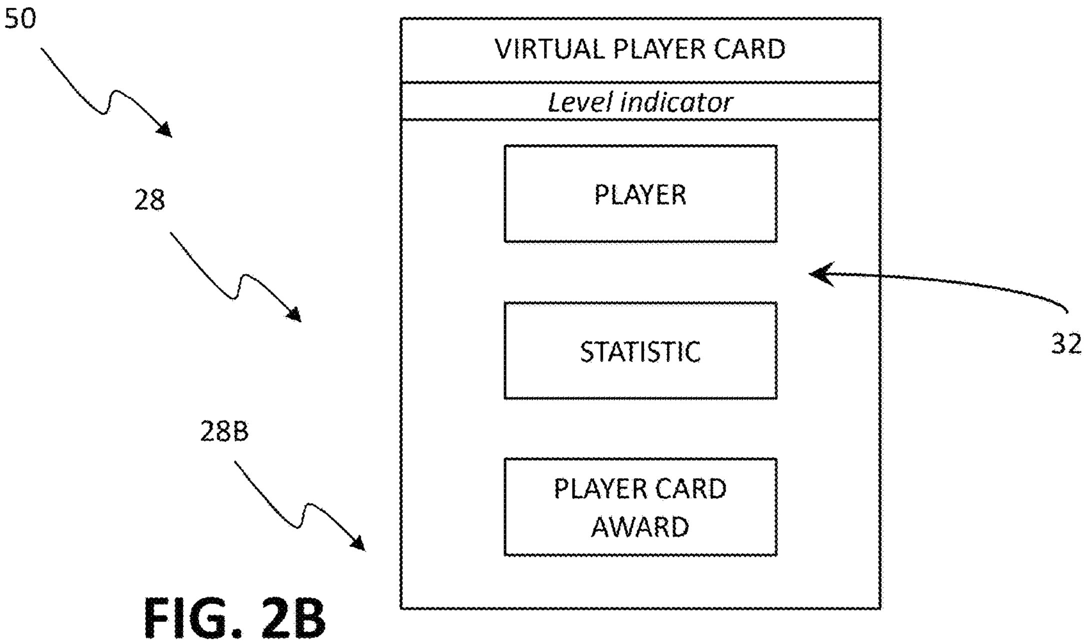
FIG. 2B is a simplified graphical representation of the virtual player card of FIG. 2A in a second mode.

System 10 for Providing/Generating Virtual Sports Cards and Operation Thereof With reference to FIGS. 1A and 2A-2B, in one aspect of the present invention, a system 10 is provided. As discussed in more detail below, the system 10 is configured to generate and/or provide virtual sports cards 50 and/or to provide a game, to one or more users, utilizing the virtual sports cards 50. In the illustrated embodiment, the system 10 includes a user interface component 12 and at least one server 14. As shown, the at least one server 14 includes a memory device 16 and at least one processor 18.

The system 10 is configured to be provide the virtual sports cards 50 and/or the game utilizing the virtual sports cards 50 to user via a website or an application, i.e., "app", running on a user device 20.

For clarity in discussing the various functions of the system 10, multiple computers and/or servers are discussed as performing different functions. These different computers (or servers) may, however, be implemented in multiple different ways such as modules within a single computer, as nodes of a computer system, etc. The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes at least one server 14. The at least one server 14 may be multiple servers 14 at a central location or at distributed locations. The servers 14 and the user devices 20 may be coupled in communication via a communications network 20. The communications network 14 may be any suitable connection, including the Internet, file transfer protocol (FTP), an Intranet, LAN, WAN, a virtual private network (VPN), cellular networks, etc. . . . , and may utilize any suitable or combination of technologies including, but not limited to wired and wireless connections, always on connections, connections made periodically, and connections made as needed.

The user computing devices 20 may include any suitable device that enables a user to access and communicate with the system 10 including sending and/or receiving information to and from the system 10 and displaying information received from the system 10 to a user. For example, in one embodiment, the user computing device 20 may include, but is not limited to, a desktop computer, a laptop or notebook computer, a tablet computer, smartphone/tablet computer hybrid, a personal data assistant, a handheld mobile device including a cellular telephone, and the like. The user computing device 20 may be used to by a user to access or to receive communications and/or data from the system 10.

The at least one server 14 may be configured to host a website or provide data to the app that is accessible by a user via the user device 20. For example, the at least one server 14 may retrieve and store a web page associated with one or more websites in response to requests received by the user via the user device 20 to allow users to interact with the system 10. In one embodiment, the at least one server 14 is configured to generate and display a web page associated with the system 10. Alternatively, or in addition, the app may be downloaded, stored and run on the user device(s) 20. As discussed in more detail below, the website and/or the app provide or implement the user interface component 12.

The at least one processor 18 executes various programs, and thereby controls components of the at least one server 14. The memory device 16 may include read only memory (ROM), random access memory (RAM), hard disk drive(s), solid state drive(s), optical drives and/or other suitable types of memory storage and may be configured to store processor-executable instructions. The processor-executable instructions may be executed by the at least one processor 18.

The user device 20 implements the user interface component 12 as a user interface 12A including a set of user inputs 24 and a display screen 26. The user inputs 24 may include one or more physical inputs and/or touchscreen inputs.

The memory device 16 may include a database (not shown) that may contain information on a variety of matters, such as, for example, user account/profile information, data retained to generated virtual sports cards 50, and/or any information that enables the system 10 to function as described herein. The memory device 16 may be configured to store programs and information and, with the at least one processor 18, to retrieve information therefrom that is used by the at least one processor 18 to perform various functions described herein. The memory device 16 may include, but is not limited to, a hard disc drive, an optical disc drive, and/or a flash memory drive. Further, the memory device may be distributed and located at multiple locations. In one embodiment of the present invention, the memory device 16 may include one or more memory devices and/or mass storage devices of one or more of the at least one server 14.

With particular reference to FIG. 1, the user interface component 12 may be installed on one of the user devices 20 and may be configured to provide the user interface 12A including the user inputs 24 and the display screen 26. The at least one server 14 is in communication with the user interface component 12 and includes the one or more processors 18 and the memory device 16 for storing computer instructions. The one or more processors 18 may be configured to execute the computer instructions to perform a method M10.

In a first step S10A, a virtual player card 50 is generated. The virtual player card 50 has an associated target statistic (or statistics) and a base award. In one embodiment, the associated target statistic is a single statistic associated with the players. For example, the associated target statistics could be points scored, rebounds made, or any measurable statistic of the players.

During a fantasy game, one or more virtual player cards may be provided to a user. As discussed above, and in more detail below, a user may be awarded an award, during the fantasy game, based on the performance of the player associated with the virtual player card 50 and as a function of the associated target statistic and the base award.

Figure 2C:
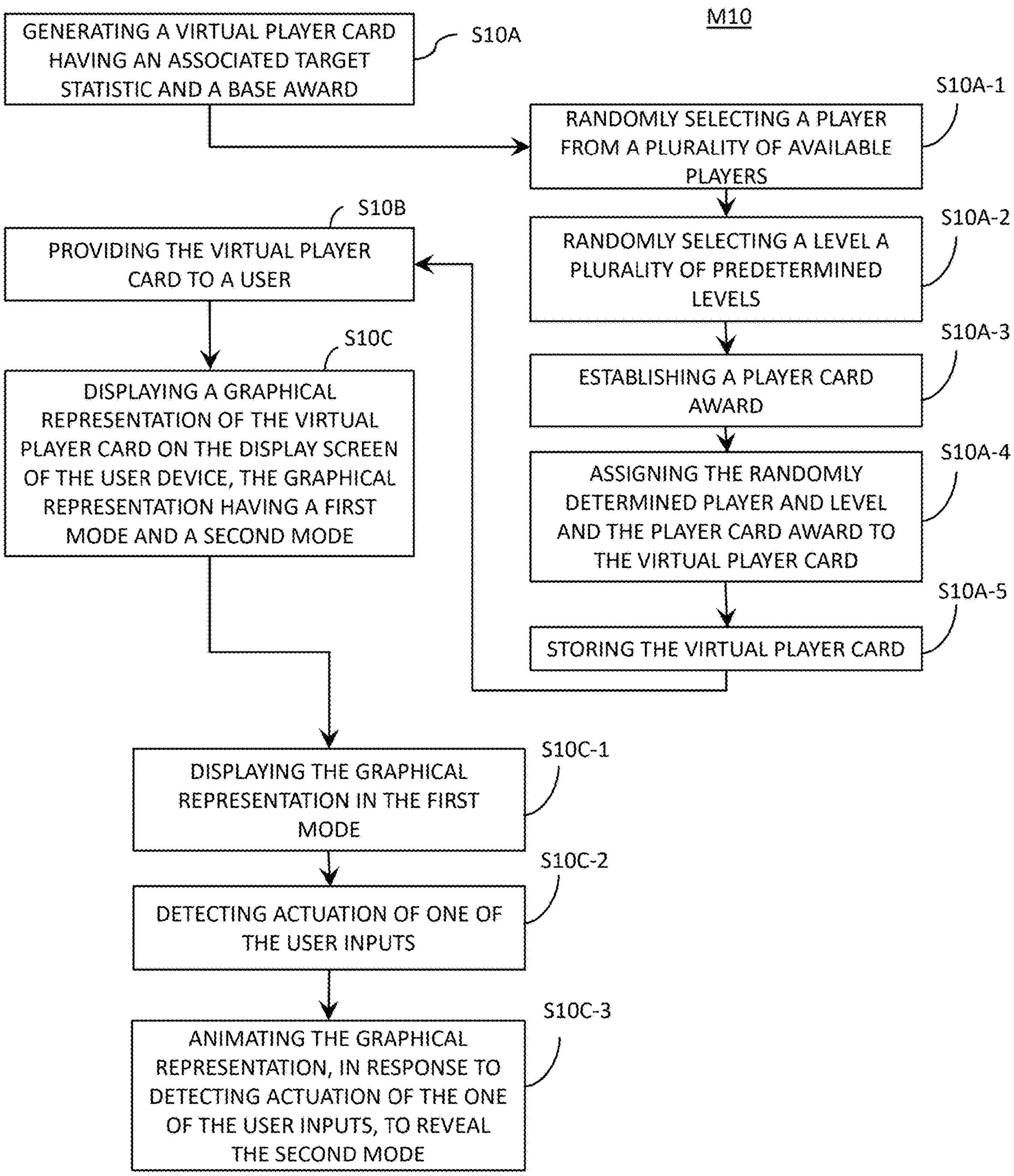
FIG. 2C is a flow diagram of a method for providing virtual player cards, according to an embodiment of the present invention.

In the illustrated embodiment shown in FIG. 2C, the virtual player card is generated by the system 10 by performing sub-steps S10A-1 through S10A-5. In step S10A-1, one of the players is randomly selected from the plurality of available players during the single game or the games played during the term. In one embodiment of the present invention, each of the plurality of available players has an equal probability of being selected.

In step S10A-2, a level is randomly selected from a plurality of predetermined levels. In step S10A-3, a player card award is established as a function of the randomly determined level.

In one embodiment, the plurality available levels are bronze, silver, and gold levels. Each level may have an associated multiplier, for example, 1×, 2×, and 10×. For each level, the base award is multiplied by the multiplier of the randomly selected level. If the base player award is $1 per point, then the player card award for a virtual player card at bronze, silver, and gold levels, would be $1, $2, and $10 per point, respectively. In other examples, the plurality of available levels includes any suitable number of levels, and each of the plurality of available levels may be identified with any type of suitable indicator including, but not limited to, alphanumeric indicators (e.g., Level A, Level 702, Level R102, etc.), or other naming schemes.

In one embodiment, each level in the plurality of predetermined levels has a weighted probability, i.e., the probability of each level being selected is not equal. Generally, levels with a lower probability will result in a higher player card award. In one example, the probabilities associated with the bronze, silver, and gold levels may be 80%, 19%, and 1%, respectively.

Returning to FIG. 2C, in sub-step S10A-4, the randomly determined player, randomly determined level, and the player card award are assigned to the virtual player card 50 and in sub-step S10A-4, the virtual player card 50 is stored within the memory device 16.

In a second step S10B, the virtual player card 50 is provided to a user. As discussed in more detail below, virtual player card(s) 50 may be provided to users in any one of a number of different ways. For example, a virtual player card or cards 50 may be purchased by users or may be provided to users for free as part of a promotion, or may be provided to users as part of another transaction, e.g., as part of another purchase or wager made by the user. Users may also be allowed to list their assigned virtual player cards 50 for sale or barter on a virtual market at which the virtual player cards 50 may be traded.

In a third step S10C, a graphical representation 28 of the virtual player card 50 is displayed on the display screen 26 of the user interface 12A. In one aspect of the present invention, the graphical representation 28 has a first mode 28A and a second mode 28B. Generally, in the first mode 20A, certain information associated with the virtual player card 50, e.g., the player, level and player card award, are hidden in the first mode 28A and visible in the second mode 28B.

With reference to FIG. 2A, in one embodiment, the virtual player card 50 may be hidden by a virtual cover or package 30. For example, the cover or package 30 may simulate a physical package or wrapper in which physical card or cards are provided.

A representation of a virtual player card 50 in the second mode 28B is shown in FIG. 2B. As shown, the virtual player card 50 may include indicia 32 (graphics, pictures, and/or text) representative of the certain information of the virtual player card 50. In the illustrated embodiment, the indicia 32 includes an indication of: the player and level randomly selected for the virtual player card 50, the statistic associated with the virtual player card 50, and the award associated with the virtual player card 50.

Returning to FIG. 2C, the step of displaying the graphical representation of the virtual player card 50 includes sub-steps S10C-1 through S10C-3.

In sub-step S10C-1, the graphical representation 28 of the virtual player card 50 is displayed on the display screen 26 of a user device 20 in the first mode 28A (see FIG. 2A). In sub-step S10C-2, actuation of one of the user inputs 24 by the user is detected, and in response to detecting actuation of one of the user inputs 24 by the user, the graphical representation 28 is animated to reveal the second mode 28B (sub-step S10C-3).

In one embodiment of the present invention, the user input 24 associated with revealing the second mode 28B is any physical or touchscreen button on the user device 20. The user must simply tap (touch or click) or actuate a physical button or touch the touchscreen of the user device 20 to reveal the second mode 28B of the graphical representation 28.

With reference to FIG. 2A, in another embodiment, the user input 24 may include a touch and drag motion (indicated by arrows 34). In this embodiment, the animation revealing the indicia 32 or second mode 28B of the graphical representation 28 reveals the indicia in the direction of the drag motion. In other words, as show in FIG. 2A, the animation will be based on the motion, e.g., location and direction, of the user's touch and drag motion.

For example, as stated above, the graphical representation 28 may include a cover or package 30 in the first mode 28A that is used to obscure or hide the indicia 32. In one aspect of the present invention the animation revealing the indicia 32 may simulate the tearing or opening of the package 30 (see below). As discussed in more detail below, the package 30 may include one or more, e.g., three virtual player cards 50. The animation may reveal all virtual player cards 50 in the package simultaneously, or the virtual player cards 50 may be revealed one at a time.

In another aspect of the present invention, the virtual player cards 50 may have an associated term. The term is related or associated with a fantasy game based on the virtual player cards 50. After the term has ended, the system 10 or the one or more processors 18 are configured to compare the associated target statistic of the virtual player card with the associated player's actual statistics over the associated term and provide the user with the player card award as a function of the associated player's actual statistic. The predetermined term may be a single sports game, a predetermined number of games, e.g., x games, a time period, e.g., a week or a month, a series of games, e.g., subsequent games between the same two teams, a season, or a career.

For example, if the term is a single game, the user to whom a virtual player card 50 has been provided may be awarded the associated card award. In the example above, if the virtual player card 50 has an associated level of gold and the player associated with the virtual player card 50 scores 20 points in the game, the card award is $200. As discussed in more detail below, in other embodiments, the associated target statistic may have an associated value and the player's actual statistic must exceed the value of the associated target statistic in order for the user to be awarded the card award.

In one embodiment, the associated target statistic is fixed, for example, always points scored. In another embodiment, the step of generating a virtual player card further includes the step of randomly selecting the associated target statistic from a set of available statistics. For example, the set of available statistics may include points scored, rebounds made, minutes played, three point shots made, or any measurable statistics.

In another embodiment, the associated target statistic may be a combination statistic, i.e., a combination of two or more underlying statistics, e.g., points scored and rebounds made.

Distribution of Virtual Player Card(s) 50

As discussed above, virtual sports card(s) may be provided or distributed to users in a number of different ways. For example, one or more virtual sports card(s) 50 may be distributed for free to users as part of a promotion or may be sold to users. Virtual sports cards 50 may be distributed individually or in packs of a plurality, for example, 3, of virtual sports cards 50.

Figure 3A:
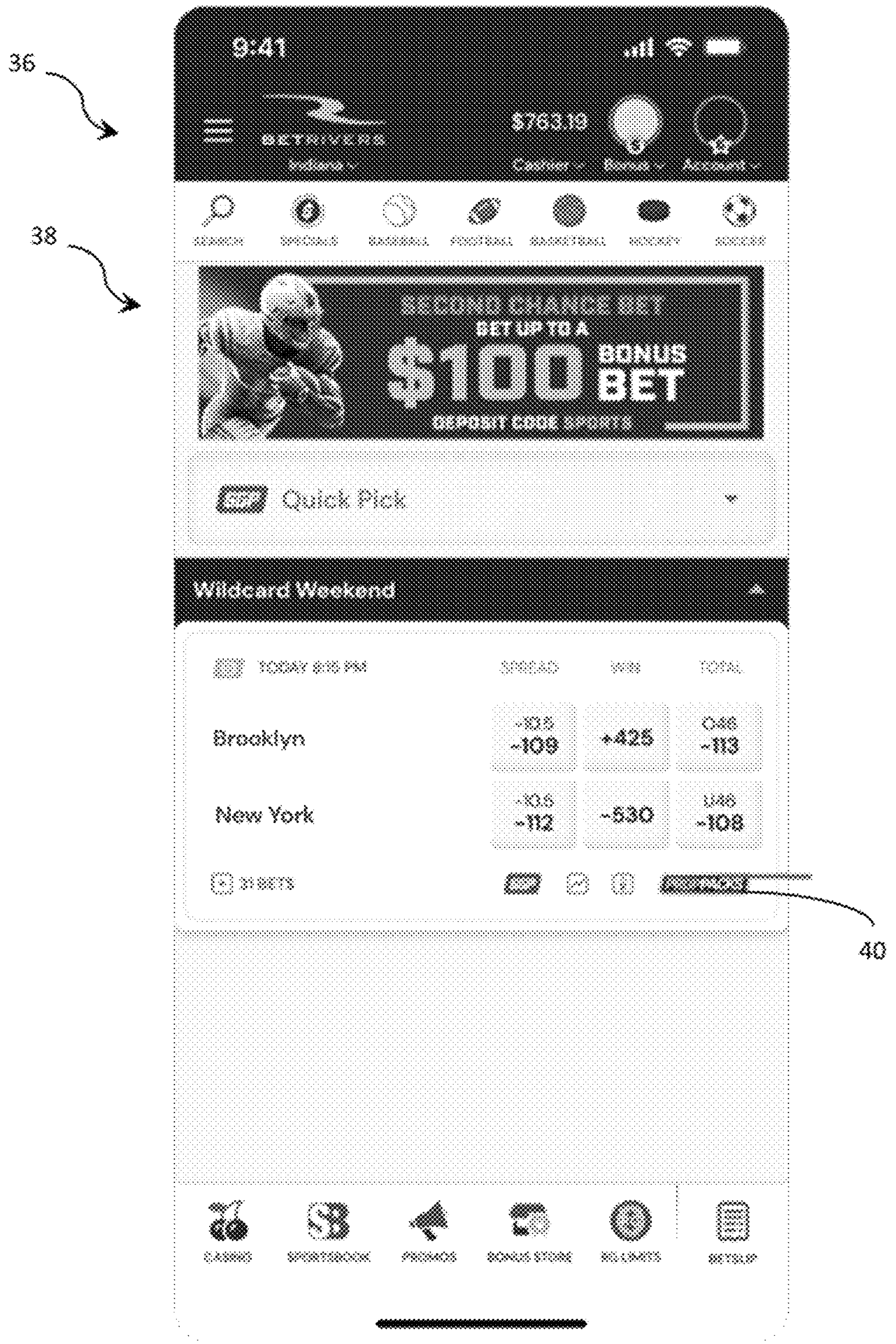
FIG. 3A is a first screenshot of a mobile application or app associated with the system of FIG. 1, according to an embodiment of the present invention.
Figure 3B:
FIG. 3B is a second screenshot of the mobile app of FIG. 3A.

In other embodiments, virtual sports cards 50 may be provided as part of another transaction. For example, with reference to FIGS. 3A-3C, in one embodiment, virtual player cards may be provided when a user places a wager in a sports betting app. With particular reference to FIG. 3A, a screen shot 36 with a sports book user interface 38 associated with an exemplary sports betting app is shown. The sports book user interface 38 allows a user to make wagers or bets on various sporting events. As shown, the sports book user interface 38 includes a button 40 that allows the user to access virtual sports cards 50 that may be utilized in a fantasy sports game. The virtual sports cards 50 may be provided in virtual packs of a plurality virtual sports cards which may be referred to as "PROP PACKS".

In the illustrated embodiment, a user must "opt-in" to obtain or be provided with PROP PACKS. Prior to opting in, actuation of the button 40 results in the display of help screens (shown in FIGS. 3B-3C) with instructions.

Figure 3C:
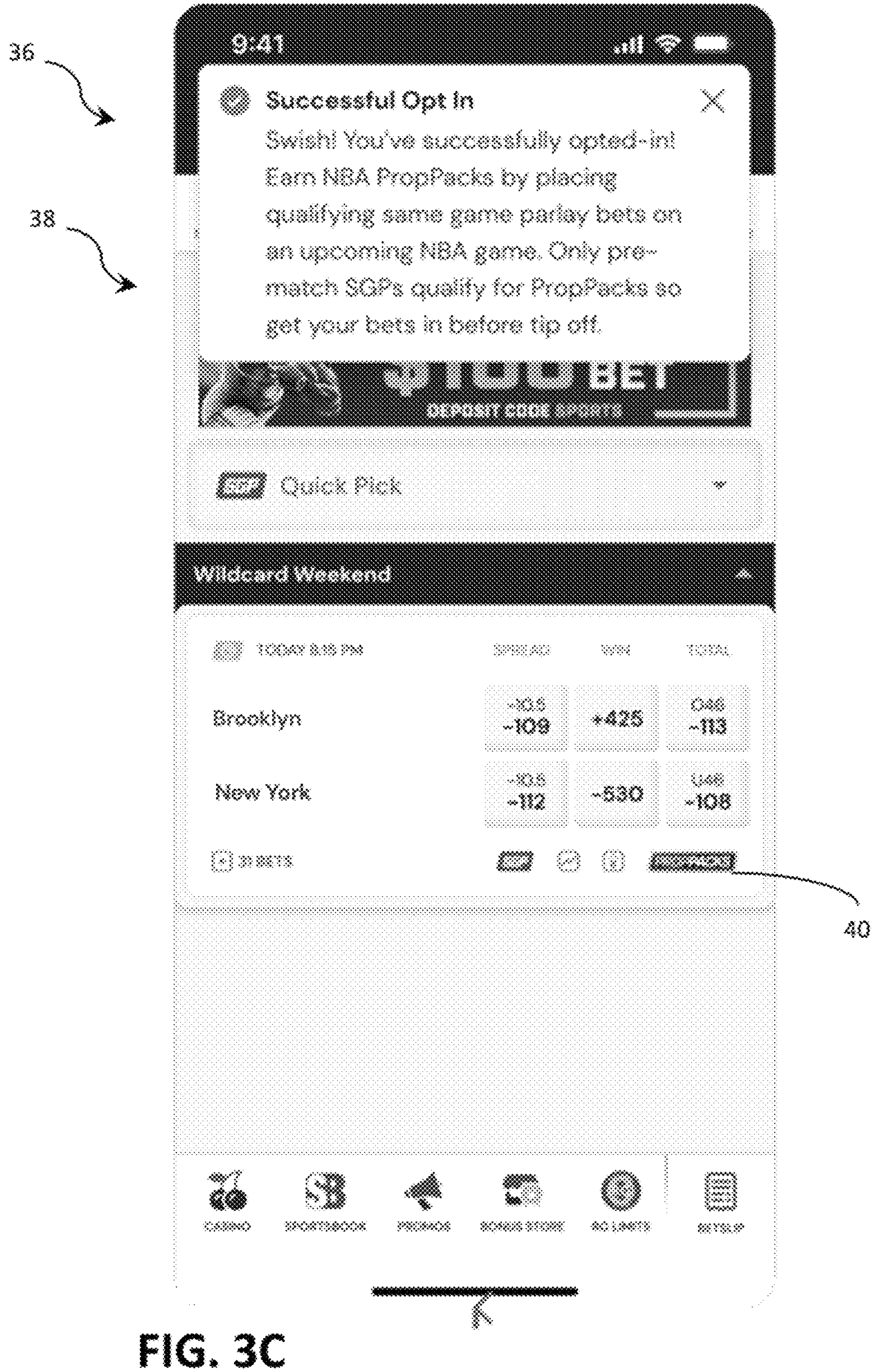
FIG. 3C is a third screenshot of the mobile app of FIG. 3A.

For example, in the illustrated embodiment, in response to the user placing a wager of $10 on a single sports game, the user may be provided with a virtual pack containing a single virtual player card 50 with a bronze level featuring a player from the game on which the wager had been placed. In response to the user placing a $25 wager, the user may be provided with a virtual pack containing randomly selected bronze and/or silver virtual player cards. In response to the user placing a $50 wager, the user may be provided with a virtual pack containing randomly selected bronze, silver, and/or gold virtual player cards. Once the user has opted into the receiving PROP PACKS, a confirmation message is displayed (FIG. 3C).

As discussed in more detail below, in this embodiment each virtual player card includes a plurality of possible card awards. Each award has a points award target that the associated player must achieve in the upcoming game for the user to win the prize indicated. If the player reaches the point award target, then the user wins the indicated prize.

Virtual Sports Cards 50 with Multiple Card Awards

With reference to FIGS. 4A-4C, 5A-5C, 6A-6C, and 7A-7C, exemplary virtual player cards, in accordance with the above embodiment is shown. In the illustrated embodiment, each card has the following points award targets: 20+, 30+, 40+, 50+. Further, each point award target has an associated card award for each level. In the illustrated embodiment, the card awards for each point award target per level are as follows:

Bronze
- 50+: $50 Bonus bet
- 40+: $20 Bonus bet
- 30+: 50% Bonus bet
- 20+: 25% Bonus boost Silver
- 50+: $500 Bonus bet
- 40+: $50 Bonus bet
- 30+: $20 Bonus bet
- 20+: 50% Profit boost Gold
- 50+: $10,000 Bonus funds
- 40+: $500 Bonus bet
- 30+: $50 Bonus bet
- 20+: $20 Bonus bet In a further aspect of the present invention, a user may be provided (or purchased) a plurality of virtual player cards 50. In addition to the award that may be provided based on each card, the user may be awarded an additional award or prize if the players on their virtual sports cards 50 combined, e.g., surpass a set of point target(s). For instance, the players accrued statistics over the term are combined with their total score compared to a target statistic. As described below, if a player opens a pack of virtual player cards 50 and receives three virtual player cards 50 with three players. If the players score 50+ points together, the user is awarded a small prize; if the players score 70+ points together, the user is awarded a bigger prize; if the players score 90+ points together, the user is awarded an even bigger prize; and if the players score 110+ points together, the user is awarded the biggest prize.

Figure 4A:
FIG. 4A is a graphic representation of a first exemplary virtual player card.
Figure 4B:
FIG. 4B is a second graphic representation of the virtual player card of FIG. 4A.
Figure 4C:
FIG. 4C is a third graphic representation of the virtual player card of FIG. 4A.

With reference to FIGS. 4A-4C, a first exemplary virtual card 50 is shown. As shown, the randomly selected level is Gold and the randomly selected player is Trey Masterson. In the illustrated embodiment, the virtual card 50 includes indicia for the level ("Gold"), the selected player ("Trey Masterson") and the points award targets and associated card awards for the selected level. In the illustrated embodiment, the term is a single game which is indicated on the bottom of the exemplary virtual card 50.

With particular reference to FIG. 4B, after the game is played, the outcome of the game, including the number of points scored by Trey Masterson are shown on the virtual player card 50. In the illustrated embodiment, Trey Masterson scored 41 points. Thus, the 40+ points award target has been met and the user is awarded a $500 Bonus Bet. The awarded award is highlighted as shown.

With particular reference to FIG. 4C, if the player has not met any of the points award targets an message indicating that the virtual player card is a non-winner is displayed.

Figure 5A:
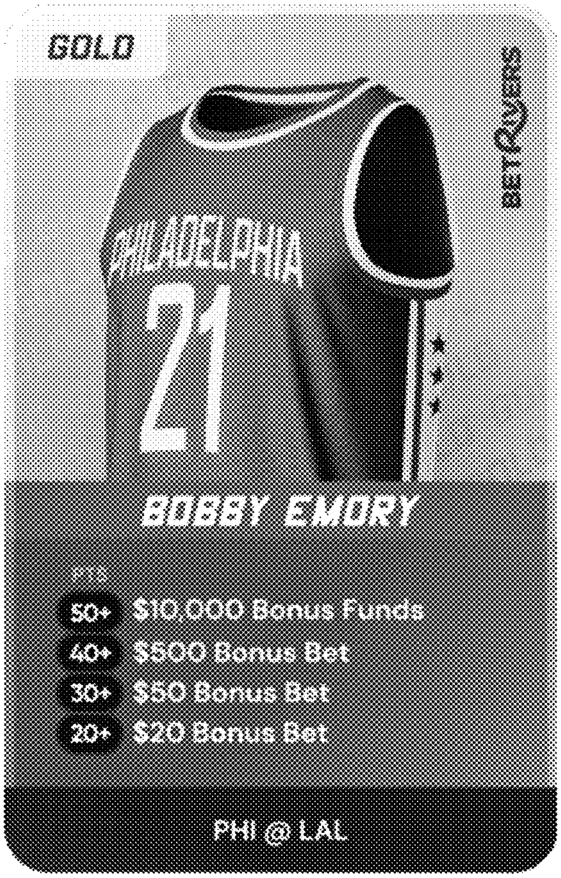
FIG. 5A s a graphic representation of a second exemplary virtual player card.
Figure 5B:
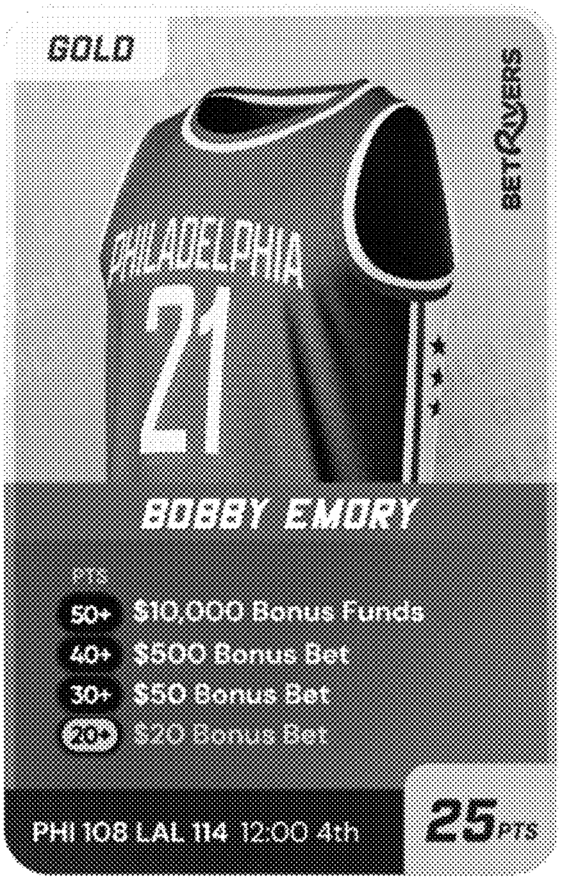
FIG. 5B is a second graphic representation of the virtual sports card of FIG. 5A.
Figure 5C:
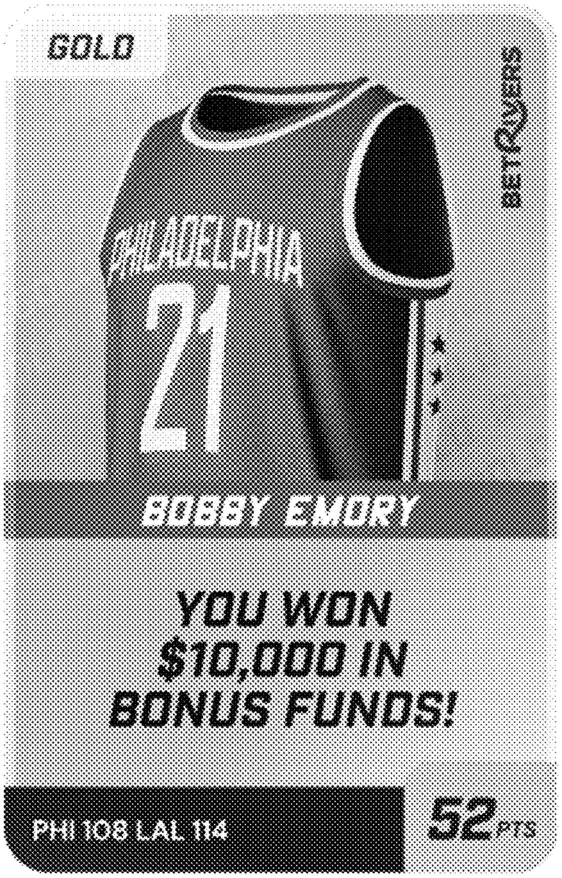
FIG. 5C is a third graphic representation of the virtual sports card of FIG. 5A.

With reference to FIGS. 5A-5C, a second exemplary virtual card 50 is shown. As shown, the randomly selected level is Gold and the randomly selected player is Bobby Emory. In the illustrated embodiment, the virtual card 50 includes indicia for the level ("Gold"), the selected player ("Bobby Emory") and the points award targets and associated card awards for the selected level. In the illustrated embodiment, the term is a single game which is indicated on the bottom of the exemplary virtual card 50.

With particular reference to FIG. 5B, after the game is played, the outcome of the game, including the number of points scored by Bobby Emory are shown on the virtual player card 50. In the illustrated embodiment, Bobby Emory scored 25 points. Thus, the 20+ points award target has been met and the user is awarded a $20 Bonus Bet. The awarded award is highlighted as shown.

With particular reference to FIG. 5C, if the player has met the highest points target (50+) a message indicating that the virtual player card has won the highest award, i.e., $10,000 (in the illustrated embodiment) is displayed.

Figure 6A:
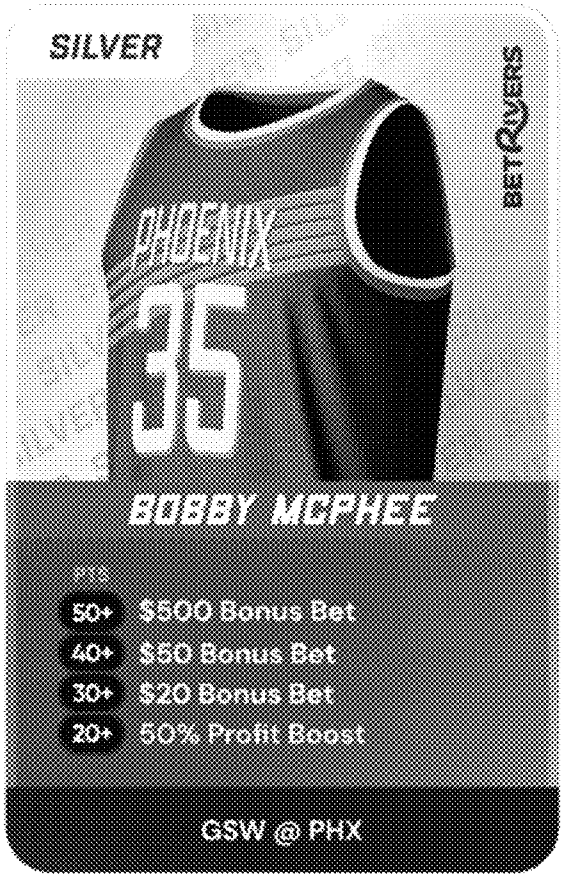
FIG. 6A is a graphic representation of a third exemplary virtual sports card.
Figure 6B:
FIG. 6B is a second graphic representation of the virtual sports card of FIG. 6A.
Figure 6C:
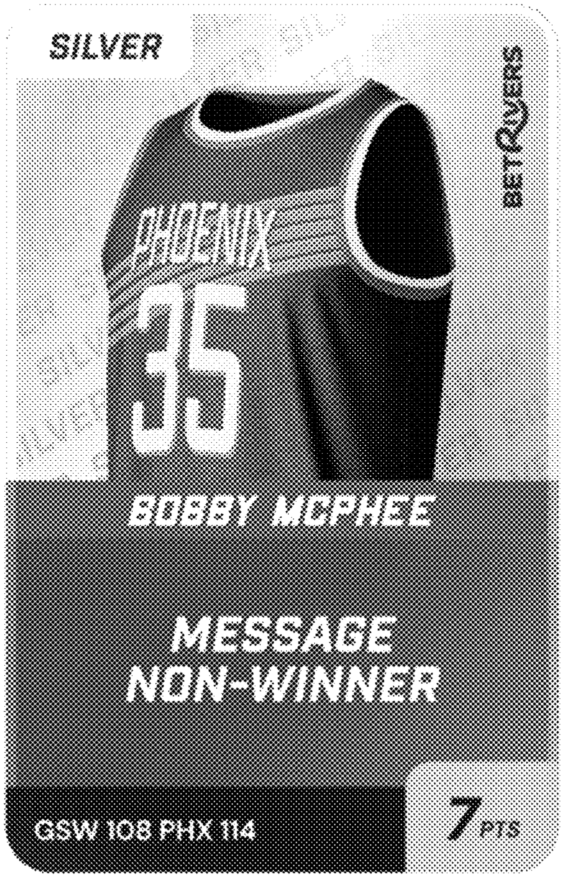
FIG. 6C is a third graphic representation of the virtual sports card of FIG. 6A.

With reference to FIGS. 6A-6C, a third exemplary virtual card 50 is shown. As shown, the randomly selected level is Silver and the randomly selected player is Bobby McPhee. In the illustrated embodiment, the virtual card 50 includes indicia for the level ("Silver"), the selected player ("Bobby McPhee") and the points award targets and associated card awards for the selected level. In the illustrated embodiment, the term is a single game which is indicated on the bottom of the exemplary virtual card 50.

With particular reference to FIG. 6B, after the game is played, the outcome of the game, including the number of points scored by Bobby McPhee are shown on the virtual player card 50. In the illustrated embodiment, Bobby McPhee scored 48 points. Thus, the 40+ points award target has been met and the user is awarded a $50 Bonus Bet. The awarded award is highlighted as shown.

With particular reference to FIG. 6C, if the player has not met any of the points award targets an message indicating that the virtual player card is a non-winner is displayed.

Figure 7A:
FIG. 7A s a graphic representation of a fourth exemplary virtual sports card.
Figure 7B:
FIG. 7B is a second graphic representation of the virtual sports card of FIG. 7A.
Figure 7C:
FIG. 7C is a third graphic representation of the virtual sports card of FIG. 7A.

With reference to FIGS. 7A-7C, a fourth exemplary virtual card 50 is shown. As shown, the randomly selected level is Silver and the randomly selected player is Shawn Smith. In the illustrated embodiment, the virtual card 50 includes indicia for the level ("Silver"), the selected player ("Shawn Smith") and the points award targets and associated card awards for the selected level. In the illustrated embodiment, the term is a single game which is indicated on the bottom of the exemplary virtual card 50.

With particular reference to FIG. 7B, after the game is played, the outcome of the game, including the number of points scored by Shawn Smith are shown on the virtual player card 50. In the illustrated embodiment, Shawn Smith scored 21 points. Thus, the 20+ points award target has been met and the user is awarded a 50% Profit boost. The awarded award is highlighted as shown and a separate message (FIG. 7C) may be displayed with the awarded award.

Figure 8A:
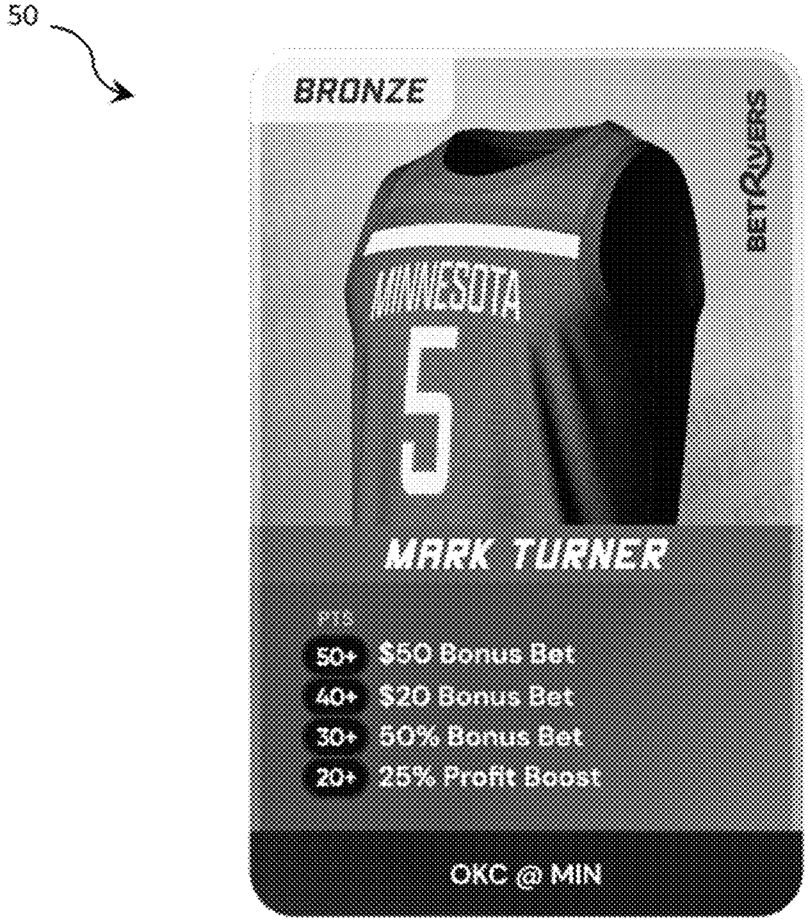
FIG. 8A is a graphic representation of a fourth exemplary virtual sports card.
Figure 8B:
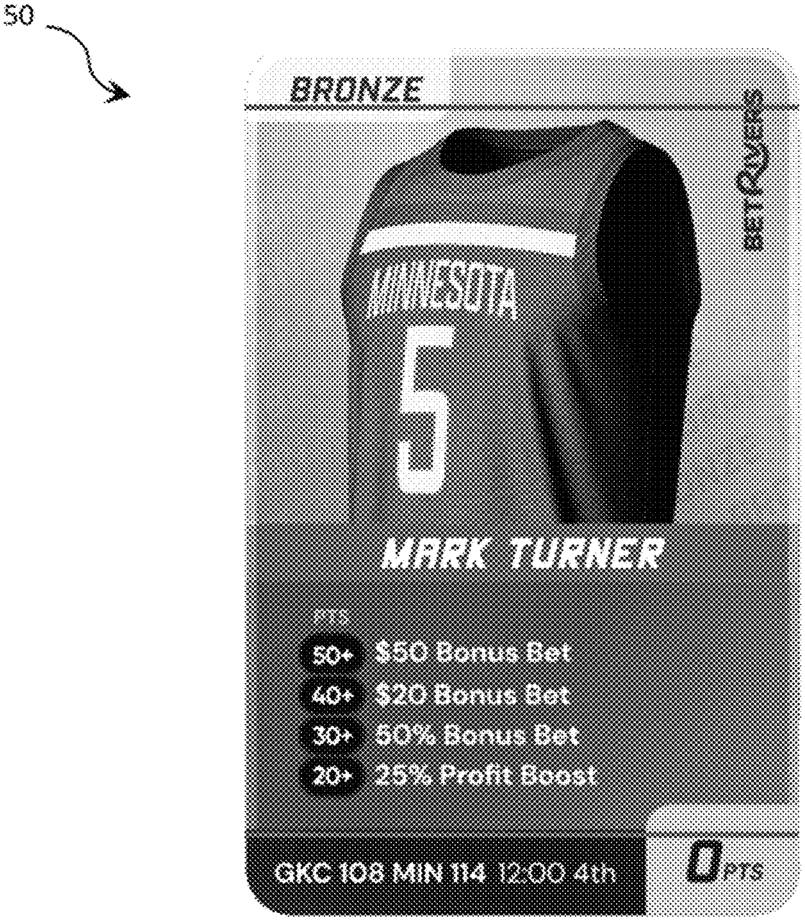
FIG. 8B is a second graphic representation of the virtual sports card of FIG. 8A.
Figure 8C:
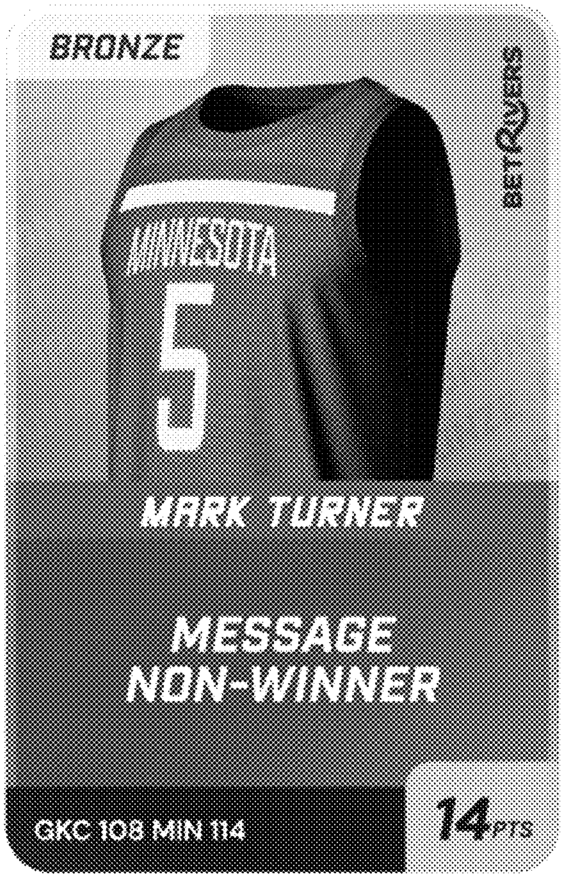
FIG. 8C is a third graphic representation of the virtual sports card of FIG. 8A.

With reference to FIGS. 8A-8C, a fifth exemplary virtual card 50 is shown. As shown, the randomly selected level is Bronze and the randomly selected player is Mark Turner. In the illustrated embodiment, the virtual card 50 includes indicia for the level ("Bronze"), the selected player ("Mark Turner") and the points award targets and associated card awards for the selected level. In the illustrated embodiment, the term is a single game which is indicated on the bottom of the exemplary virtual card 50.

With particular reference to FIG. 8B, after the game is played, the outcome of the game, including the number of points scored by Mark Turner are shown on the virtual player card 50. In the illustrated embodiment, Mark Turner scored 0 points. Thus, none of the points award target have been met and the user is not awarded an award. A separate message (FIG. 8C) may be displayed indicated that the virtual card 50 is a non-winner.

Packs of Virtual Sports Cards 50

Figure 9A:
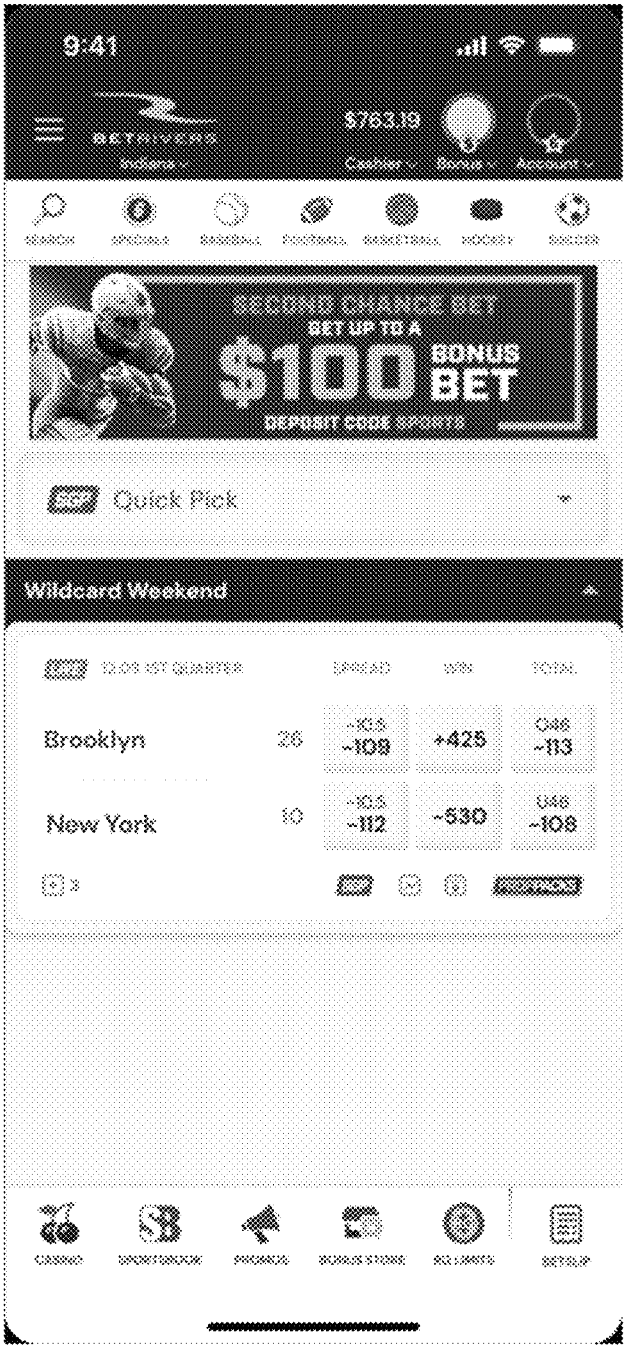

With reference to FIGS. 9A-91, as discussed above in one embodiment, a virtual package 30 containing a plurality of virtual player cards 50 may be provided and displayed on the display screen 26. With particular reference to FIG. 9A, as discussed above, virtual player cards 50 may be provided along with wagers made sporting event via a sports book user interface 38. A package 30 (or "PROPPACK") of virtual sports cards 50 may be awarded when a wager is made (see above).

Figure 9B:
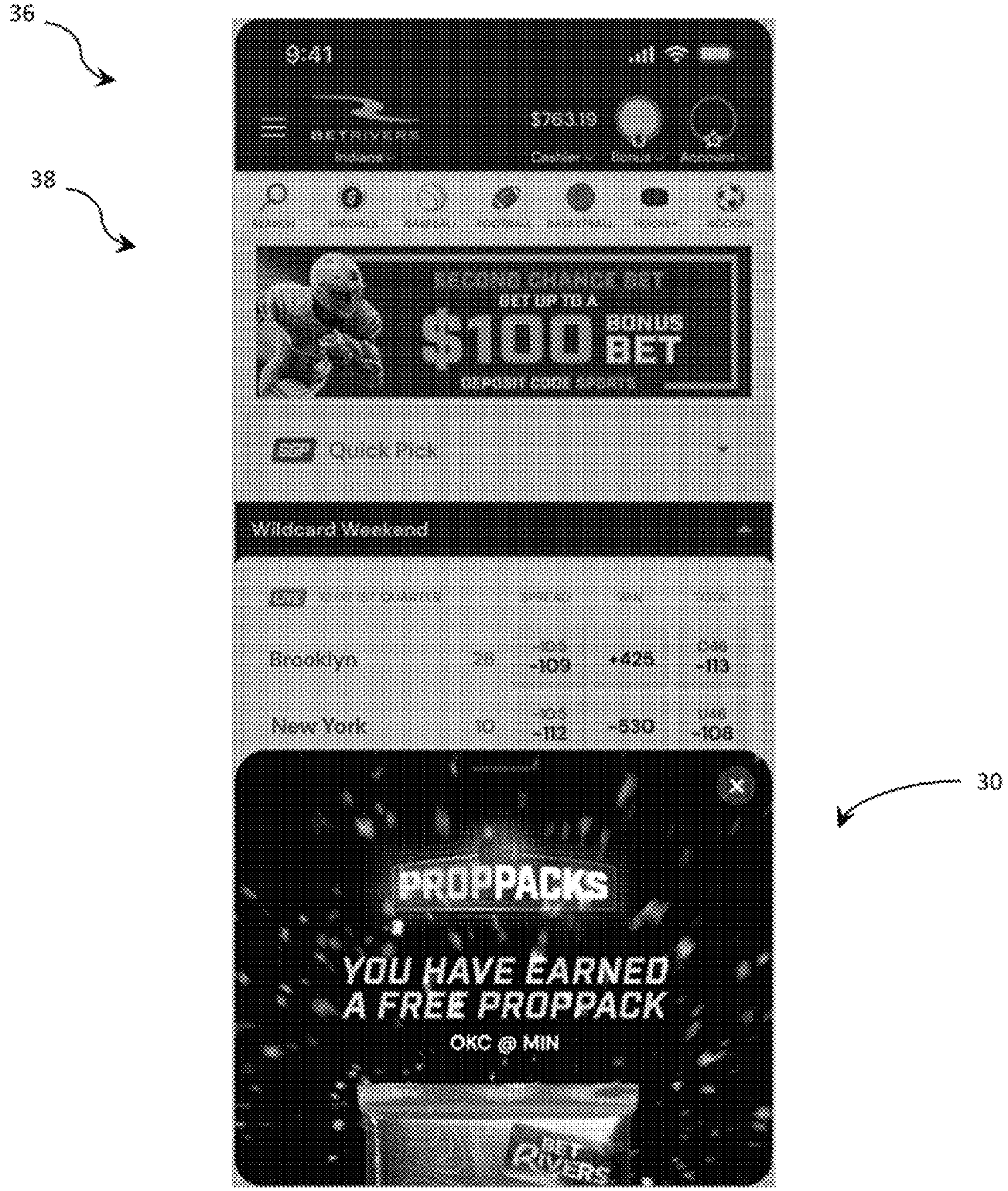
Figure 9C:
Figure 9D:
Figure 9E:
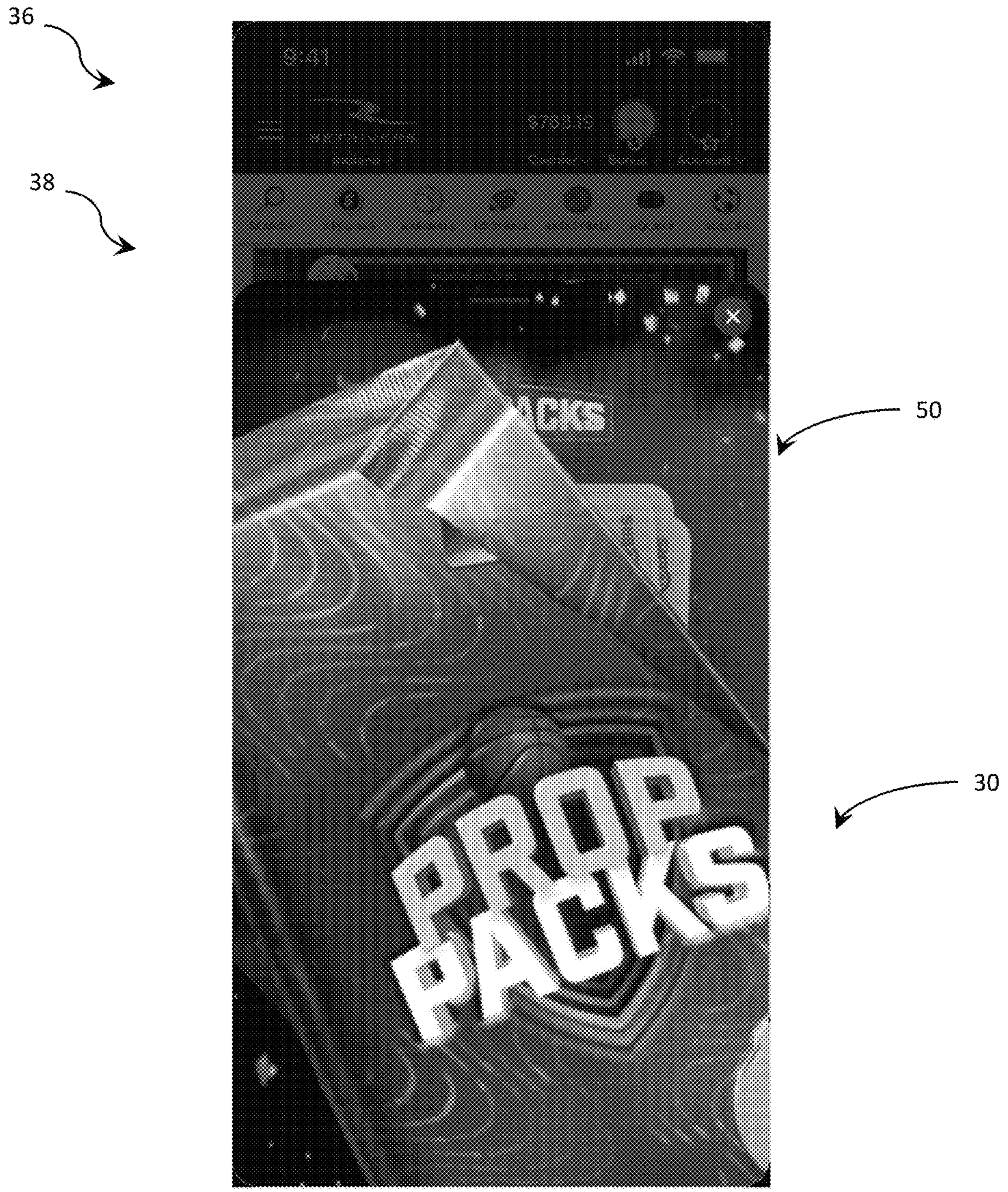
Figure 9F:
Figure 9G:
Figure 9H:
Figure 9I:

With particular reference to FIGS. 9B-9D, in response to a package 30 of virtual sports cards 50 being awarded, an animation of the package 30 entering and being displaying on the display screen 26 is shown. With particular reference to FIGS. 9E-91 in response to actuation of a user input 24 (which may be for instance, a touch/clock and drag motion on the display screen 26), an animation of the package 30 being opened and the virtual sports cards 50 being displayed may be shown.

Exemplary Operating Environments of Various Embodiments

Figure 10:
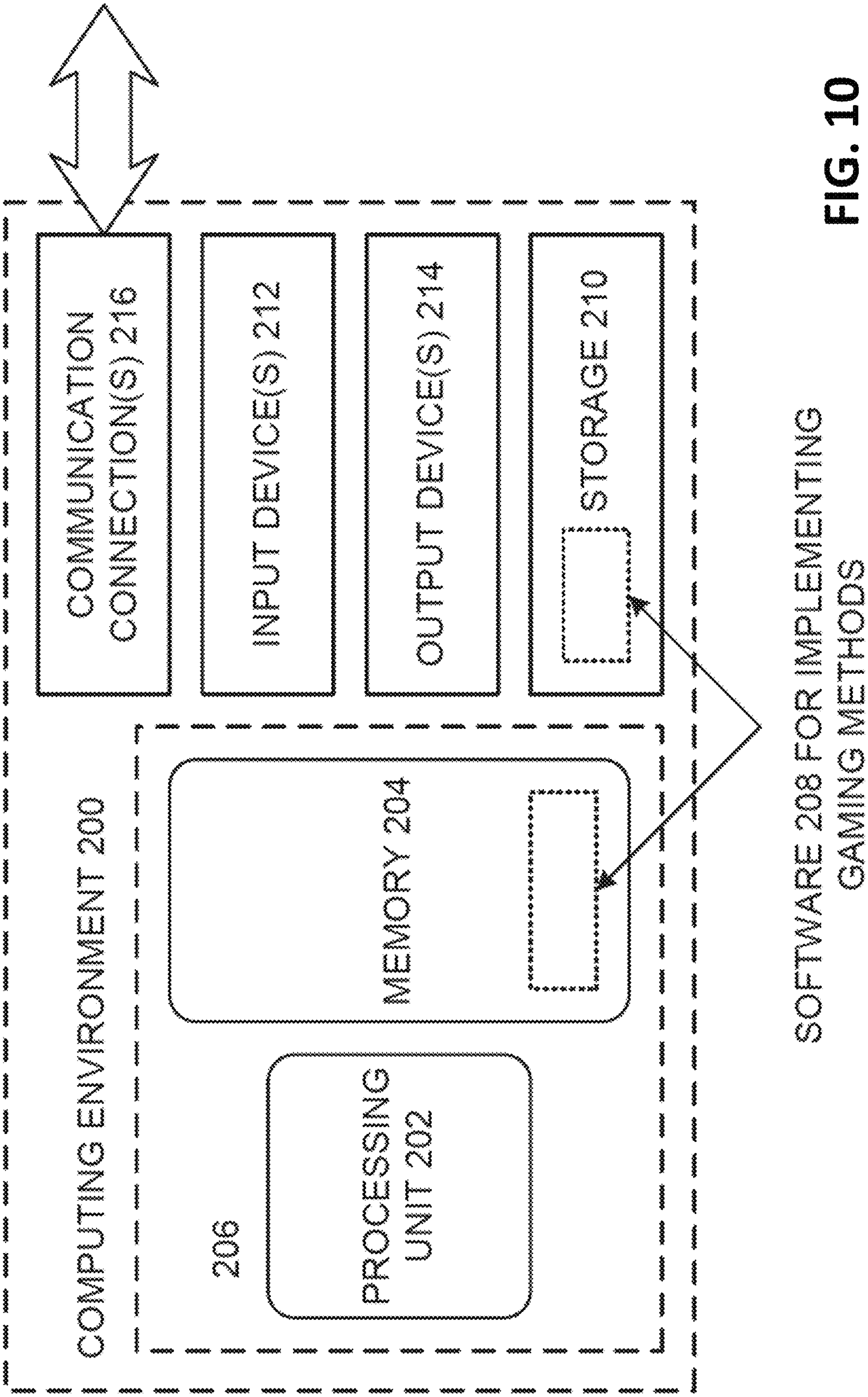
FIG. 10 is a block diagram of an exemplary computing environment which may be utilized to implement the system of FIG. 1.

FIG. 10 illustrates an example of suitable computing environment 200 with which embodiments of the disclosed technology may be implemented. For example, computing environment 200 can be used to generate a virtual player card and or virtual pack game or bonus as discussed herein. Computing environment 200 is not intended to suggest any limitation as to the scope of use or functionality of the disclosed technology, as the techniques and tools described herein may be implemented in diverse general-purpose or special-purpose environments that have computing hardware.

With further reference to FIG. 10, computing environment 200 may include configuration 206 that comprises at least one processing unit 202 and memory 204. Computing environment 200 may be any commercially available computer, including desktop computers, laptop computers, servers, mobile phones, smart phones, tablet computers, netbooks, wearable computers (such as smart watches), or other devices that include computing hardware.

At least one processing unit 202 may execute computer-executable instructions. In a multi-processing system, multiple processing units may execute computer-executable instructions to increase processing power. At least one processing unit 202 may constitute any physical device or group of devices having electric circuitry that performs a logic operation on an input or inputs. For example, at least one processing unit 202 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processing unit 202, for example, may be pre-loaded into a memory integrated with or embedded into the controller or may be stored in a separate memory. In some embodiments, at least one processing unit 202 may include more than one processing unit. Each processing unit may have a similar construction, or the processing units may be of differing constructions that are electrically connected or disconnected from each other. For example, at least one processing unit 202 may be separate circuits or integrated in a single circuit. When more than one processing unit is used, the processing units may be configured to operate independently or collaboratively. At least one processing unit 202 may be coupled electrically, magnetically, optically, acoustically, mechanically, or by other means that permit them to interact. In at least one embodiment, processing unit 202 can use APIs to perform operations or receive information to enable a user to play a game, multiple games, or qualify for a game.

Memory 204 may be volatile memory (e.g., registers, cache, RAM), non-volatile memory (e.g., ROM, EEPROM, flash memory), or some combination of the two. Memory 204 stores software 208 for implementing one or more of the described embodiments. For example, memory 204 may store software 208 for implementing any of the disclosed techniques described herein and their accompanying user interfaces. Memory 204 may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. Memory 204 may include one or more separate storage devices collocated or disbursed, capable of storing data structures, instructions, or any other data. Memory 204 may further include a memory portion containing instructions for the processor to execute. Memory 204 may also be used as a working memory device for the processors or as a temporary storage. Memory 204 can store APIs to perform one or more games.

In some embodiments, memory 204 can be a non-transitory computer readable medium containing instructions that when executed by at least one processing unit (e.g., processing unit 202) of computing environment 200, cause the computing environment 200 to perform a method or set of operations. Non-transitory computer readable mediums may be any medium capable of storing data in any memory in a way that may be read by any computing device with a processor to carry out methods or any other instructions stored in the memory. The non-transitory computer readable medium may be implemented to include any combination of software, firmware, and hardware. Software may preferably be implemented as an application program tangibly embodied on a program storage unit or computer readable medium consisting of parts, or of certain devices or a combination of devices. The application program may be uploaded to, and executed by, a machine comprising any suitable architecture. In at least one embodiment, a non-transitory computer readable medium includes a software program that includes instructions to perform operations that cause a computer or process to generate control signals or perform operations.

Computing environment 200 may also include an operating system and microinstruction code. The various processes and functions described in this disclosure may be either part of the microinstruction code or part of the application program, or any combination thereof, which may be executed by one or more processing units 202. In addition, various other peripheral units may be connected to the computer platform such as an additional data storage unit and a printing unit. Furthermore, a non-transitory computer readable medium may be any computer readable medium except for a transitory propagating signal.

Any of the computer-executable instructions stored in computing environment 200 for implementing the disclosed techniques as well as any data created and used during implementation of the disclosed embodiments may be stored on one or more computer-readable media (e.g., non-transitory computer-readable media). The computer-executable instructions may be part of, for example, a dedicated software application or a software application that is accessed or downloaded via a web browser or other software application (such as a remote computing application or gaming app). Such software may be executed, for example, on a single local computer or in a network environment (e.g., via the internet, a wide-area network, a local-area network, a client-server network (such as a cloud computing network), or other such network) using one or more network computers. For example, a gaming app may be downloaded to a mobile device (such as a mobile phone, smart phone, tablet computer, or wearable computer) from an "app store" and installed locally on the computing environment 200. The gaming app may be configured to interact with a gaming platform server or a remote game server in order to exchange game play or account information and may be configured to implement the gaming platform or games locally or by interfacing with the gaming platform or remote game server during game play in order to provide the gaming platform and game play experience. The gaming embodiments disclosed herein may also be provided through an app hosted by a social media provider. Further, the embodiments of the disclosed technology may also be implemented through software that provides a browser-based gaming experience (e.g., through a dedicated website or through a website hosted by a social media provider).

Computing environment 200 may include additional features. For example, computing environment 200 may include storage 210, one or more input devices 212, one or more output devices 214, and one or more communication connections 216 for communicating with any remote devices/services. An interconnection mechanism (not shown) such as a bus, controller, or network interconnects the components of computing environment 200. Typically, operating system software (not shown) provides an operating environment for other software executing in computing environment 200, and coordinates activities of the components of computing environment 200.

Storage 210 may be removable or non-removable and may include any tangible non-transitory nonvolatile memory or storage medium which may be used to store information and which may be accessed within computing environment 200. Storage 210 may also store instructions for software 208 implementing any of the described techniques, systems, or environments and may act as a non-transitory computer-readable medium described above.

Input device(s) 212 may be a touch input device such as a keyboard, touchscreen, mouse, pen, virtual reality device (e.g., headset or glasses), trackball, a voice input device, a scanning device, or another device that provides input to computing environment 200. Output device(s) 214 may be a display device (e.g., a computer monitor, smartphone display, tablet display, netbook display, or touchscreen), printer, speaker, CD-writer, or another device that provides output from computing environment 200.

One or more communication connection(s) 216 may enable communication over a communication medium to another computing entity. The communication medium may convey information such as computer-executable instructions or other data in a modulated data signal. A modulated data signal may be a signal wherein one or more of its characteristics are set or changed in such a manner as to encode information in the signal. By way of example, communication media may include wired or wireless techniques implemented with an electrical, optical, RF, infrared, acoustic, or other carrier. One or more communication connection(s) 216 may include hardware for implementation of such communications (e.g., a suitable network card, wireless transceiver, and the like).

As noted, the various methods may be described in the general context of computer-readable instructions stored on one or more computer-readable media. Computer-readable media are any available media that may be accessed within or by computing environment 200.

Figure 11:
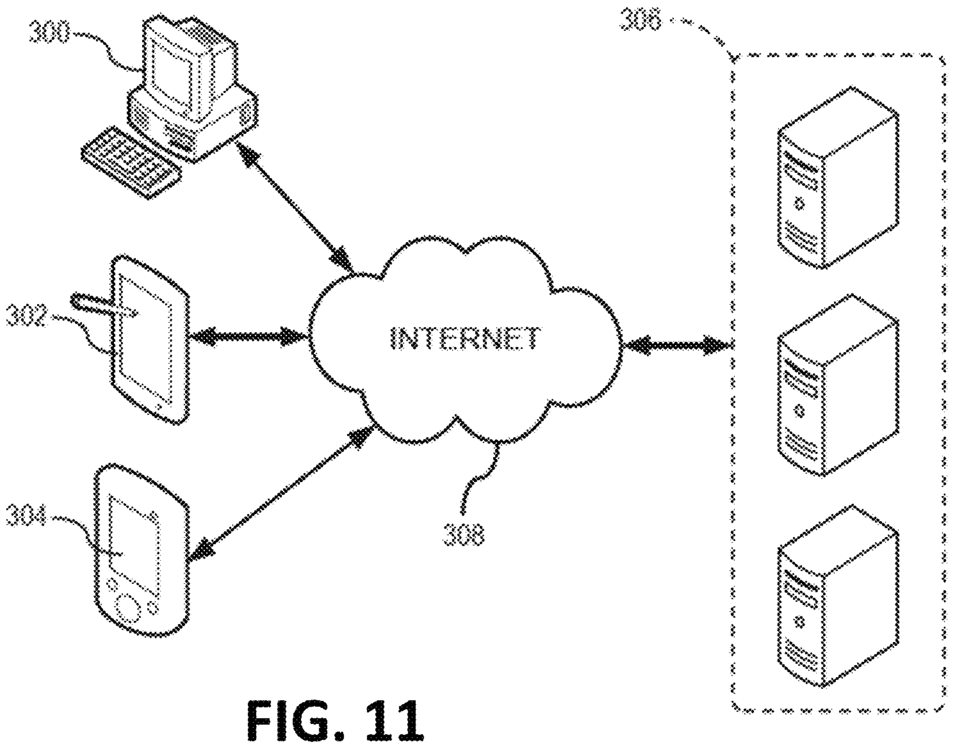
FIG. 11 is a block diagram of an exemplary network topology which may be utilized to implement the system of FIG. 1.

An example of a possible network topology (e.g., a client-server network, an internet-connected network, or cloud-based network) for implementing an embodiment according to the disclosed technology is illustrated in FIG. 11. Networked computing devices (e.g., desktop computer 300, tablet computer 302, smart phone 304, any or all of which can implement computing environment 200 of FIG. 10) may be, for example, computers running a browser, plug-in, or other software that communicates with one or more internet gaming platform computers 306 (e.g., one or more servers in a cloud computing environment or one or more dedicated servers) via a network 308 (e.g., a network that at least partially includes the internet, as illustrated, or other network, such as a LAN). Consistent with the present disclosure, some implementations may involve network 308. Network 308 may constitute any combination or type of physical or wireless computer networking arrangement used to exchange data. For example, network 308 may be the Internet, a private data network, a virtual private network using a public network, a Wi-Fi network, a mesh network, a local area network (LAN), a wide area network (WAN), or other suitable connections and combinations that may enable information exchange among various components of the system. In some implementations, network 308 may include one or more physical links used to exchange data, such as Ethernet, coaxial cables, twisted pair cables, fiber optics, or any other suitable physical medium for exchanging data. Network 308 may also include a public, wired network or a wireless cellular network. Network 308 may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data or information between separate entities.

One or more internet gaming platform computers 306 may include a server configured to provide the gaming platform, a separate server configured to host and facilitate game play of one or more games, or a separate server configured to handle user payment and credit card information and to comply with any applicable payment card security standards (e.g., PCI security standards). Any of these services may alternatively be provided by a single server. Further, the servers may be virtual servers configured to easily migrate, install, and co-exist on the underlying server hardware.

Computing devices 300, 302, 304 and one or more internet gaming platform computers 306 may have computer architectures as shown in FIG. 10 and discussed above.

Computing devices 300, 302, 304 are not limited to traditional personal computers but may include other computing hardware configured to connect to and communicate with network 308 (e.g., smart phones (such as smart phone 304), tablets (such as tablet 302), or other mobile computing devices, servers, network devices, dedicated devices, and the like).

In the illustrated embodiment, computing devices 300, 302, 304 may be configured to communicate with one or more internet gaming platform computers 306 via network 308 (e.g., a network that at least partially includes the internet). In certain implementations, one or more internet gaming platform computers 306 may execute software for performing any of the disclosed low-denomination gaming methods (e.g., any of the gaming selection or lobby functions or game play functions or features). In some embodiments, the interface provided to the user through which the user may select a game or denomination is referred to as a gaming "lobby" or gaming "room." One or more internet gaming platform computers 306 may transmit data to and receive data from any of computing devices 300, 302, 304 in order to implement the disclosed game lobby functionalities and games (e.g., to transmit game play data or game play data converted to show real-money game information to the computing devices as well to receive user selections made by the user of the computing devices (such as a selected wager amount, selected gaming units, selected bets, other selections made during a game feature, and other such user-inputted information commonly used in wager-based games)). In some example embodiments, executable code may be downloaded from one or more internet gaming platform computers 306 to implement the gaming lobby and games locally on computing devices 300, 302, 304; or, alternatively, data for rendering (or pre-rendered data for) user interfaces or other displays may be sent from one or more internet gaming platform computers 306 to computing devices 300, 302, and 304 (in other words, the game lobby and games are executed by one or more internet gaming platform computers 306, but image content data for displaying the game and lobby to the player (e.g., in real-time or substantially real-time) may be sent to computing devices 300, 302, 304).

Figure 12:
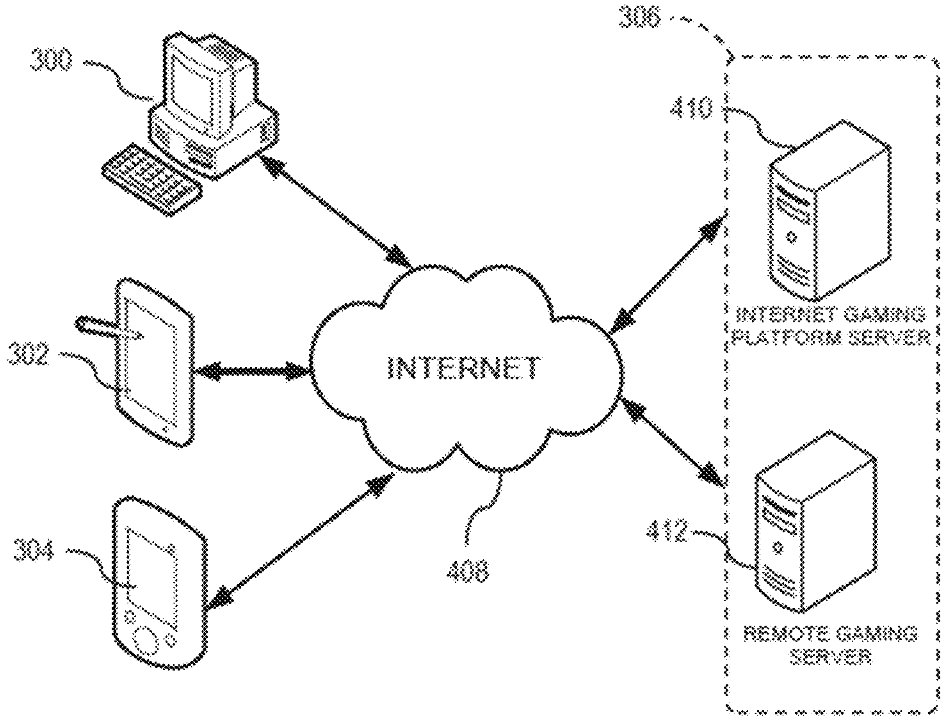
FIG. 12 is a block diagram of one or more an exemplary gaming platform computers that may be utilized to implement the system of FIG. 1.

In FIG. 11, one or more internet gaming platform computers 306 may be controlled by an internet gaming platform operator and may include the game servers that facilitate game play with a user/player. Another example of a possible network topology for implementing a system according to the disclosed technology is illustrated in FIG. 12. As shown in FIG. 12, one or more internet gaming platform computers 306 may include internet gaming platform server 410 and remote gaming server 412. Remote gaming server 412 may facilitate game play with a player and may be separate from internet gaming platform server 410. Remote gaming server 412 and internet gaming platform server 410 may be operated by different entities. For example, one or more internet gaming platform computers 306 may be remote gaming server 412 that may be controlled and operated by a third-party game vendor. In at least one embodiment, gaming platform computers 306 can perform APIs that enable communication of game information to computing devices 300, 302, 304.

As further shown in FIG. 12, computing devices 300, 302, 304 may be, for example, computers running a browser or other software connected to network 408 (e.g., a network that at least partially includes the internet, as illustrated, or other network, such as a LAN). As above, computing devices 300, 302, 304 as well as internet gaming platform server 410 and remote game server 412 may have computer architectures as shown in FIG. 10 and discussed above. Computing devices 300, 302, 304 are not limited to traditional personal computers but may comprise other computing hardware configured to connect to and communicate with network 408 (e.g., smart phones (such as smart phone 304), tablets (such as tablet 302), or other mobile computing devices, servers, network devices, dedicated devices, and the like).

In the illustrated embodiment, computing devices 300, 302, 304 may be configured to communicate with internet gaming platform server 410 or remote game server 412 via network 408. In particular embodiments, computing devices 300, 302, 304 may be internet gaming platform server 410 configured to implement a gaming platform that allows a respective user of computing devices 300, 302, 304 to select a desired game to play or related selections for wagers made in the game. As more fully explained below, internet gaming platform server 410 may be used to facilitate house-based game matrices and related features disclosed herein.

In some embodiments, computing devices 300, 302, 304 may be configured to communicate with a separate server (not shown) configured to handle user payment and credit card information, or other account information, and to comply with any applicable payment card security standards (e.g., PCI security standards). In other embodiments, however, the user payment and credit card information may be maintained in the same server as the internet gaming platform server.

Further, in certain embodiments of the illustrated architecture, computing devices 300, 302, 304 and remote gaming server 412 may be configured to communicate with each other (e.g., via one or more APIs that specify a communication protocol between computing devices 300, 302, 304) and facilitate game play for a user. In the illustrated embodiment, one or more internet gaming platform computers 306 may be internet gaming platform server 410 and remote gaming server 412 configured to provide one or more games for play at computing devices 300, 302, 304. Remote gaming server 412 may be a remote game server operated by a third-party game vendor.

In certain embodiments, after a game is selected, computing devices 300, 302, 304 may be configured to communicate with one or more internet gaming platform computers 306 configured to implement the desired game selected by the user. For instance, in some implementations, computing devices 300, 302, 304 communicate only with one or more internet gaming platform computers 306 during game play, e.g., to receive game play data from one or more internet gaming platform computers 306 at computing devices 300, 302, 304 as well to receive user selections from the user of any of computing devices 300, 302, 304 at computing devices 300, 302, 304. In other implementations, computing devices 300, 302, 304 may communicate with one or more internet gaming platform computers 306 as well as internet gaming platform server 410 during game play (e.g., to receive game play data from one or more internet gaming platform computers 306 and converted game play data to show real-money game information from internet gaming platform server 410 at computing devices 300, 302, 304, as well to receive user selections made by the user of computing devices 300, 302, 304 (e.g., a selected gaming unit, a selected wager amount, selected paylines, selected bets per payline, selections made during a game feature, and other such user-inputted information commonly used in wager-based games)) at internet gaming platform server 410 or remote gaming server 412.

In still other implementations, computing devices 300, 302, 304 may communicate only with internet gaming platform server 410 during game play (e.g., to receive game play data converted to show real-money game information from one or more internet gaming platform computers 306 at computing devices 300, 302, 304 as well to receive user selections from the user of any of computing devices 300, 302, 304 (e.g., a selected gaming unit, a selected wager amount, selected paylines, selected bets per payline, selections made during a game feature, and other such user-inputted information commonly used in wager-based games)) at internet gaming platform server 410. This situation may arise, for example, for configurations in which remote gaming server 412 passes game play information to the internet gaming platform server 410, which then supplements the game play information and transmits a modified version of the data to computing devices 300, 302, 304 as discussed more fully below.

In general, one or more internet gaming platform computers 306 may transmit data to any of computing devices 300, 302, 304 for implementing the disclosed gaming platform functionalities or game play functionalities. For instance, executable code may be downloaded from one or more internet gaming platform computers 306 to locally implement the gaming methods on computing devices 300, 302, 304; or, alternatively, data for rendering (or pre-rendered data for) user interfaces (e.g., game play displays that allow for user input) or other displays may be sent from any of one or more internet gaming platform computers 306 to computing devices 300, 302, 304 (for instance, in certain embodiments, the game lobby (or game room) functionalities are executed by internet gaming platform server 410 and the selected game is executed by remote gaming server 412, and image content data for displaying the game lobby (or game room) functionalities as well as the game play functionalities are sent to computing devices 300, 302, 304 from one or more internet gaming platform computers 306).

In the illustrated embodiments, networks 408 may be implemented at least in part using the internet or a similar public network and operated using an appropriate protocol (e.g., the HTTP protocol). Illustrated networks 408 may also include a Local Area Network ("LAN") using wired networking (e.g., the Ethernet IEEE standard 802.3 or other appropriate standard) or wireless networking (e.g., one of the IEEE standards 802.11a, 802.11b, 802.11g, or 802.11n, which are commonly used for Wi-Fi networks, or other appropriate standard). Further, data transmitted through networks 408 to or from any of the devices or servers may be transmitted using a secure sockets layer ("SSL") connection.

Figure 13:
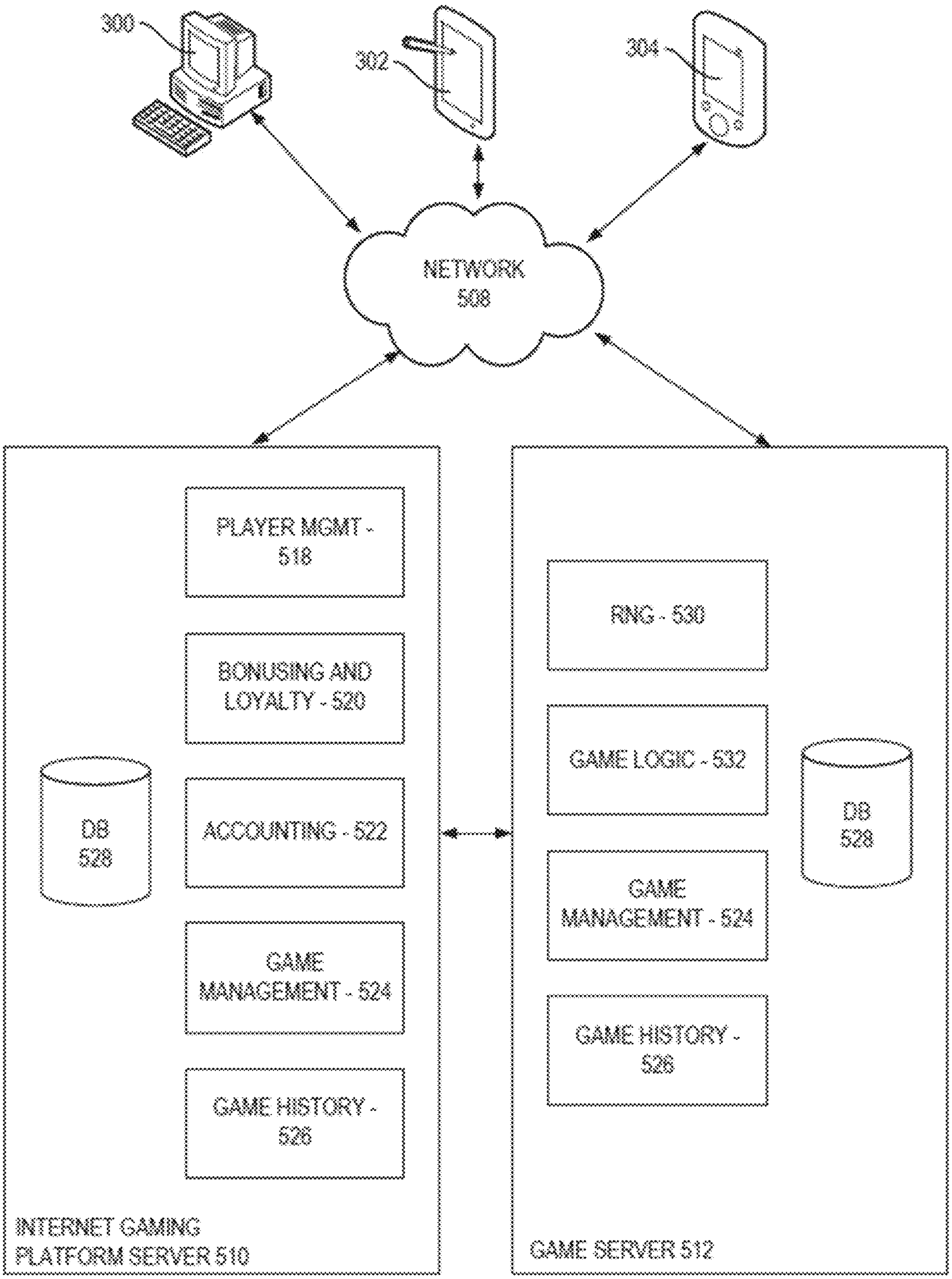
FIG. 13 is a block diagram of an internet gaming platform that may be utilized to implement the system of FIG. 1.

FIG. 13 is a schematic block diagram illustrating various components of example internet gaming platform server 510 and game server 512 (which can correspond to internet gaming platform server 410 and remote game server 412, respectively). The various components are by way of example only and not to be construed as limiting. Instead, any of the components may be used alone or in any combination or subcombination with one another, as well as with other components. Further, in other embodiments, one or more components from internet gaming platform server 510 may be implemented in game server 512 and vice versa. Internet gaming platform server 510 and game server 512 may have computer architectures as shown in FIG. 10 and discussed above.

In the illustrated embodiment, internet gaming platform server 510 and game server 512 may be configured to communicate with any of computing devices 300, 302, 304 (e.g., using an SSL connection) or other computing devices via network 508, which may be at least partially implemented by a public network such as the internet. (References to "internet gaming platform server" 510 in this description have been used for convenience but should be construed as being equally applicable to remote gaming server 412 which uses a different type of network.) Computing devices may be, for example, any of desktop computer 300, tablet device 302, or smart phone 304, operated by a user (e.g., player) but may also be any other computing device with access to the network. Internet gaming platform server 510 and game server 512 may also be configured to communicate with each other (e.g., via one or more APIs) for internet gaming platform server 510 and game server 512, respectively). This inter-server communication may also be through a public network (such as the internet) or through a dedicated network (e.g., a LAN). In some embodiments, game server 512 may be remote gaming server 412 operated by a third-party vendor (entity) different from the operator of the internet gaming platform server 510 and may communicate with internet gaming platform server 510 over the internet. Still further, in certain embodiments, any one or more of the components of internet gaming platform server 510 and game server 512 may be implemented as part of a single server.

In the illustrated embodiment, internet gaming platform server 510 may be configured to facilitate game play for a player (e.g., operating any computing devices 300, 302, 304) by coordinating access to games on one or more game servers, such as game server 512, controlling wagering options (e.g., according to any of the embodiments disclosed below), and managing player account activities. Internet gaming platform server 510 may comprise a variety of components (e.g., implemented as one or more software modules) for providing the gaming platform functionalities. For instance, in the illustrated embodiments, internet gaming platform server 510 may comprise player management component 518, bonusing and loyalty component 520, accounting component 522, game management component 524, or game history component 526, any one or more of which may be configured to store or retrieve data from platform database 528.

Player management component 518 may be configured to perform player registration, player verification, and player profile maintenance operations. Bonusing and loyalty component 520 may be configured to maintain a player's loyalty program data including level progressions as described herein and provide awards or incentives to the player according to the rules of the loyalty program. Bonusing and loyalty component 520 may also be configured to store and provide bonuses to players in accordance with any bonus offers provided through the system (e.g., bonus amounts added to a player's account upon registration, upon deposit of a certain amount of money, upon game play during certain "happy hour" times, awards relating to a virtual player card and or virtual pack games or bonuses as discussed herein or levels progressions as described herein, etc.).

Accounting component 522 may maintain a player's account information and may, in some embodiments, interact with another server storing a player's personal payment card information. Accounting component 522 may also include a module for handling withdrawals or deposits of funds such as prize payouts in real-world currency (e.g., by interfacing with a player's bank account or credit card company). Further, when a game is selected for play by a user, accounting component 522 may be configured to provide a total account balance for use during game play of the selected game (which is sometimes referred to as a seamless wallet approach), or provide a portion of the total balance (which may be selected by the user) which is provided as a separate account balance for use during game play of the selected game.

Game management component 524 may be configured to store a list of games supported by the platform and to launch and appropriately configure the games upon selection by a user. In some implementations, game management component 524 may also provide web-hosting or other services that provide an interface to the player (e.g., a game lobby), or provide a downloadable application that provides the interface to the player. For instance, game management component 524 may provide a browser-based gaming experience (e.g., through a dedicated website or through a website hosted by a social media provider) or provide the gameplay experience via a downloadable app with which game management component 524 may interface during game lobby operations or game play. In other implementations, the website or app providing the game lobby to the user is separate from internet gaming platform server 510 and game management component 524 (e.g., as part of a separate layer that interfaces with the platform).

Game management component 524 may also be configured to interact with and facilitate game play with game server 512. For example, game management component 524 may include a messaging module for interfacing with game server 512 via an API. For instance, in some cases, game management component 524 may receive, from a remote user, a selection of a game available on game server 512 and launch the game (e.g., by interfacing with game server 512 through an API to start the game and exchange the desired information (such as player identification and available balance (or credits) for game play). In some embodiments, game server 512 then interfaces directly with the remote user to provide the game play experience. In such embodiments, game server 512 may operate to provide game play information to internet gaming platform server 510 as game play progresses (e.g., on a game-by-basis, including wager selection and in-game (e.g., game feature) activity) or after a game play session of multiple games is complete (e.g., upon a user selecting to exit a game). In other embodiments, game server 512 may transmit information to internet gaming platform server 510, which interfaces with the remote user to provide the game play experience.

For instance, in one example implementation, game management component 524 may receive game play information (e.g., data indicating the outcome of a game as determined by random number generator (RNG) component 530 and game logic 532) or game play image data from remote game server 512, and cause the display of real-money statistics together with the game play for the wager-based game on a display device of a remote computing device operated by the remote user. This may be performed, for example, by rendering the display screen at internet gaming platform server 510 (using, for instance, game management component 524) and transmitting image content data for the rendered image to the remote device. Or, data regarding the real-money statistics, game play, or game play images (e.g., data indicating the outcome of a game or other associated image content data) may be transmitted to the remote device for local rendering at the remote user's device. In some implementations, internet gaming platform server 510 may be configured to receive game play or other game play image content data from game server 512, process such data (e.g., to provide the simultaneous display of the real-money statistics with the game play), and transmit data (e.g., image content data) for causing the desired display on the remote device.

In still other embodiments, both game server 512 and internet gaming platform server 510 interface with the remote user during game play to provide the game play experience. For instance, data may be sent from both internet gaming platform server 510 and game server 512 to the remote user's device to produce the desired display. Further, game management component 524 may communicate with accounting component 522 to obtain player account information during game launch or to update the player account information during game play (e.g., tracking bonus awards and levels progressions) or upon completion of a game play session (after performing any conversion to account for bonus awards and wins) so that accounting component 522 may maintain accurate account information for a player.

Game history component 526 may be configured to maintain and store a player's game play history for accounting or compliance purposes. It is to be understood that the components and functionalities described above are by way of example and not limitation. Any of the functionalities may be performed by other components in internet gaming platform server 510 or even by other components that interface with internet gaming platform server 510. For example, certain desired techniques and functions described herein may be performed by accounting component 522 instead of game management component 524.

Remote game server 512 in FIG. 13 may comprise RNG component 530, game logic component 532, game management component 524, or game history component 526, any one or more of which may be configured to store or retrieve data from remote game server database 528.

RNG component 530 may comprise one or more random number generator modules that provide random numbers to game logic for purposes of facilitating game play, such as for providing sets of event gaming numbers. Random number generator component 530 may comprise, for example, a module that has been approved by a gaming authority in one or more jurisdictions.

Game logic component 532 may be configured to provide the actual game play for a game selected for play by a player and include the game assets (e.g., game graphic and animation data, game audio data, reel strip data, game feature data, pay-table data, and other such game play data). Game management component 524 may be configured to interact with and facilitate game play with internet gaming platform server 510 (e.g., by receiving a game request for a player along with game configuration information and facilitating the local launch and delivery of the game to the player from the game server). For instance, game management component 524 may include a messaging module for interfacing with internet gaming platform server 510 via the platform's or the game server's API.

In some cases, each game module in game server 512 may have its own (potentially unique) game-specific API or control mechanism, in which case game management component 524 may also interface with the game-specific API or game control mechanism (e.g., after performing any necessary translation or data formatting) to facilitate the communication between internet gaming platform server 510 and the game module. Further, for embodiments in which game server 512 at least partially interfaces directly with the remote user's device, game management component 524 may include a module for facilitating such communication.

Further, game management component 524 may include a module for performing player authentication operations or in-game funds handlings.

Game history component 526 may be configured to maintain and store a player's game play history for accounting or compliance purposes. It is to be understood that the components and functionalities described above are by way of example and not limitation. Any of the functionalities may be performed by other components in gamer server 512 or even by other components that interface with game server 512.

In the example description above, support for bonus awards may be provided by the gaming platform (e.g., by internet gaming platform server 510). It is to be understood that support for bonus awards may also be provided by one or more components or modules within game server 512. For instance, game server 512 may have a component (e.g., game management component 524) that may provide for bonus awards according to any of the disclosed bonus award types or display techniques described herein.

For any of internet gaming platform server 510 and game server 512 embodiments described above or elsewhere herein, it is to be understood that the precise character and content of the data transmitted between internet gaming platform server 510 and game server 512 as well as to and from computing devices 300, 302, 304, will vary depending on the implementation. For example, in some embodiments, computing devices 300, 302, 304 may operate as remote game clients and download some code and game assets for local execution and use during play of a particular game. The game code may include code for rendering the game display (including any of the modified displays disclosed herein) in response to receipt of certain information from internet gaming platform server 510 or game server 512 (e.g., game play information that includes game outcome data and converted gaming statistics data). The game code may also include code for determining and sending user requests to internet gaming platform server 510 or game server 512 (e.g., data concerning a player's desired wager, paylines, bets per payline, selections during a game feature, bonus applications or any other user input used during game play).

For instance, in some particular implementations, any of computing devices 300, 302, 304 may have at least some of the image asset or reel strip data for a game downloaded locally so that it may locally render an image of the game results using a relatively small set of image content data sent by internet gaming platform server 510 or game server 512. In these implementations, RNG component 530, pay-table data, and win determination logic are typically performed by game server 512 (e.g., for regulatory purposes). The image content data used for local rendering in such implementations may comprise game play information that includes game outcome data, such as the random numbers determined from RNG component 530, the amount of a win determined from the pay-table, or the account balance after a win. The image content data may also include information that originated from any of computing devices 300, 302, 304 (e.g., the number of paylines bet, the amount bet per payline, or the total amount bet) via user selection but which, in some examples, is processed, accepted, and passed back to computing devices 300, 302, 304 by internet gaming platform server 510 or game server 512 (e.g., as part of game play information).

In some embodiments, the exchange of data between internet gaming platform server 510, game server 512, or computing devices 300, 302, 304 may be performed substantially continuously. Therefore, the user may view any modified or supplemental data regarding gameplay in real-time or substantially real-time.

A variety of suitable gaming platforms may be used or adapted to implement the embodiments of the disclosed technology. Online gaming platforms or game servers provided by, for example, NYX Gaming Group, Playtech, or Amaya, among others, may be adapted for use with the disclosed technology.

Figure 14:
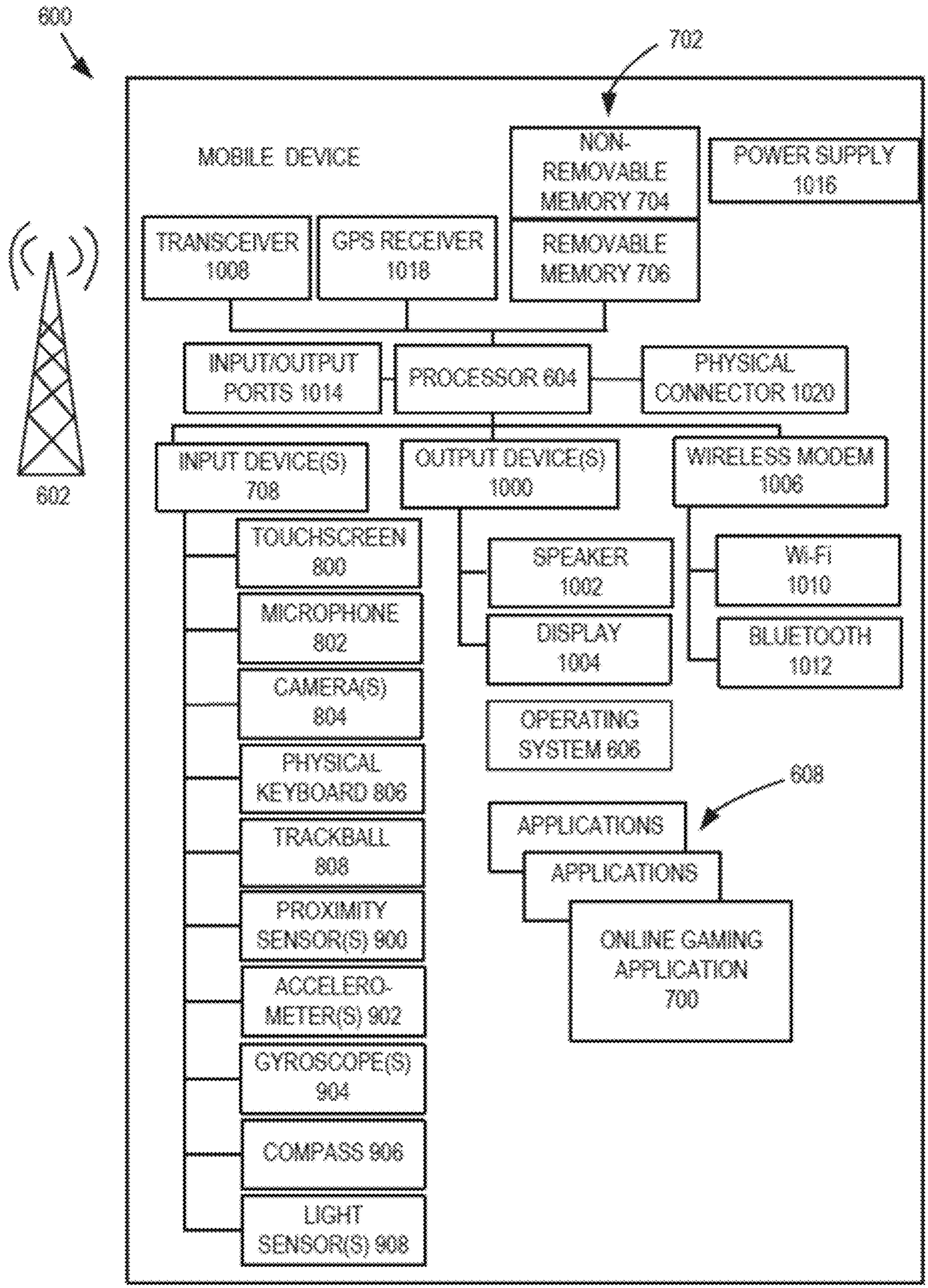
FIG. 14 is a block diagram of an internet gaming server and game server that may be utilized to implement the system of FIG. 1.

As noted, internet gaming platform server 510 or game server 512, may communicate and facilitate game play on a mobile device with which internet gaming platform server 510 or game server 512 communicate. FIG. 14 illustrates a schematic block diagram depicting a detailed example of a mobile computing device 600 capable of implementing embodiments of the disclosed technology (e.g., capable of displaying and providing interaction mechanisms for use with embodiments of the disclosed online gaming methods and systems (e.g., via communication with a gaming platform server/game server (via a website or application) as disclosed herein)). Mobile computing device 600 may include a variety of optional hardware and software components. In general, a component in mobile computing device 600 may communicate with any other component of mobile computing device 600, although not all connections are shown, for case of illustration. Mobile computing device 600 may be any of a variety of computing devices (e.g., a cell phone, smartphone, handheld computer, laptop computer, notebook computer, tablet computer, media player, PDA, or other such mobile devices) and may allow wireless two-way communications with one or more mobile communications networks, such as a Wi-Fi, cellular, or satellite network.

Mobile computing device 600 may include a controller or processor 604 (e.g., signal processor, microprocessor, ASIC, or other control and processing logic circuitry) for performing such tasks as signal coding, data processing, input/output processing, power control, or other functions. Processor 604 may be at least one processing unit 202. Operating system 606 controls the allocation and usage of the components and support for one or more application programs 608, such as online gaming application 700 that may implement one or more of the innovative features described herein. One or more application programs 608 may further include common mobile computing applications (e.g., telephony applications, email applications, calendars, contact managers, web browsers, social network applications, messaging applications), or any other computing application.

Mobile computing device 600 may include memory 702. Memory 702 may include non-removable memory 704 or removable memory 706. Memory 702, non-removable memory 704, or removable memory 706 may be memory 206. Non-removable memory 704 may include RAM, ROM, flash memory, a hard disk, or other well-known memory storage technologies (e.g., non-transitory computer-readable storage media). Removable memory 706 may include Flash memory or a Subscriber Identity Module ("SIM") card, which is well known in Global System for Mobile Communications ("GSM") communication systems, or other well-known memory storage technologies, such as "smart cards." Memory 702 may be used for storing data or code for running operating system 606 and applications 608 (including online gaming application 700). Example data may include web pages, text, images, sound files, video data, or other datasets to be sent to or received from one or more network servers or other devices via one or more wired or wireless networks. Memory 702 may be used to store a subscriber identifier, such as an International Mobile Subscriber Identity ("IMSI"), and an equipment identifier, such as an International Mobile Equipment Identifier ("IMEI"). Such identifiers may be transmitted to a network server to identify users and equipment.

Mobile computing device 600 may support one or more input devices 708, such as touchscreen 800 (e.g., capable of capturing finger tap inputs, finger gesture inputs, multi-touch finger tap inputs, multi-touch finger gesture inputs, or keystroke inputs for a virtual keyboard or keypad), microphone 802 (e.g., capable of capturing voice input), one or more cameras 804 (e.g., capable of capturing still pictures or video), physical keyboard 806, trackball 808, one or more proximity sensors 900, one or more accelerometers 902, one or more gyroscopes 904, compass 906, one or more light sensors 908, or buttons. Mobile computing device 600 may further support one or more output devices 1000, such as speaker 1002, and display 1004. Other possible output devices 1000 may include piezoelectric or other haptic output devices. Some devices may serve more than one input/output function. For example, touchscreen 800 and display 1004 may be combined in a single input/output touchscreen.

Mobile computing device 600 may provide one or more natural user interfaces ("NUIs"). For example, operating system 606 or applications 608 may comprise speech-recognition software as part of a voice user interface that allows a user to operate mobile computing device 600 via voice commands.

Wireless modem 1006 may be coupled to one or more antennas (e.g., transceiver 1008) and may support two-way communications between processor 604 and external devices, as is well understood in the art. Wireless modem 1006 may be shown generically and may include, for example, a cellular modem for communicating at long range with mobile communication network 602, Bluetooth-compatible modem 1012, or Wi-Fi-compatible modem 1010 for communicating at short range with an external Bluetooth-equipped device or a local wireless data network or router. Wireless modem 1006 may be typically configured for communication with one or more cellular networks, such as a GSM network for data and voice communications within a single cellular network, between cellular networks, or between the mobile device and a public switched telephone network ("PSTN").

Mobile computing device 600 may further include at least one input/output port 1014, power supply 1016, satellite navigation system receiver 1018, such as a Global Positioning System ("GPS") receiver, transceiver 1008 (for wirelessly transmitting analog or digital signals) or physical connector 1020, which may be a USB port, IEEE 1394 (Fire Wire) port, or RS-232 port. The illustrated components are not required or all-inclusive, as any of the components shown may be deleted and other components may be added.

Mobile computing device 600 may be part of an implementation environment in which various types of services are provided by a computing "cloud." For example, the cloud may comprise a collection of computing devices, which may be located centrally or distributed, that provide cloud-based services to various types of users and devices connected via a network such as the internet. Some tasks (e.g., processing user input and presenting a user interface) may be performed on local computing devices (e.g., connected devices) while other tasks (e.g., performing game play and gaming platform services) may be performed in the cloud.

Figure 15:
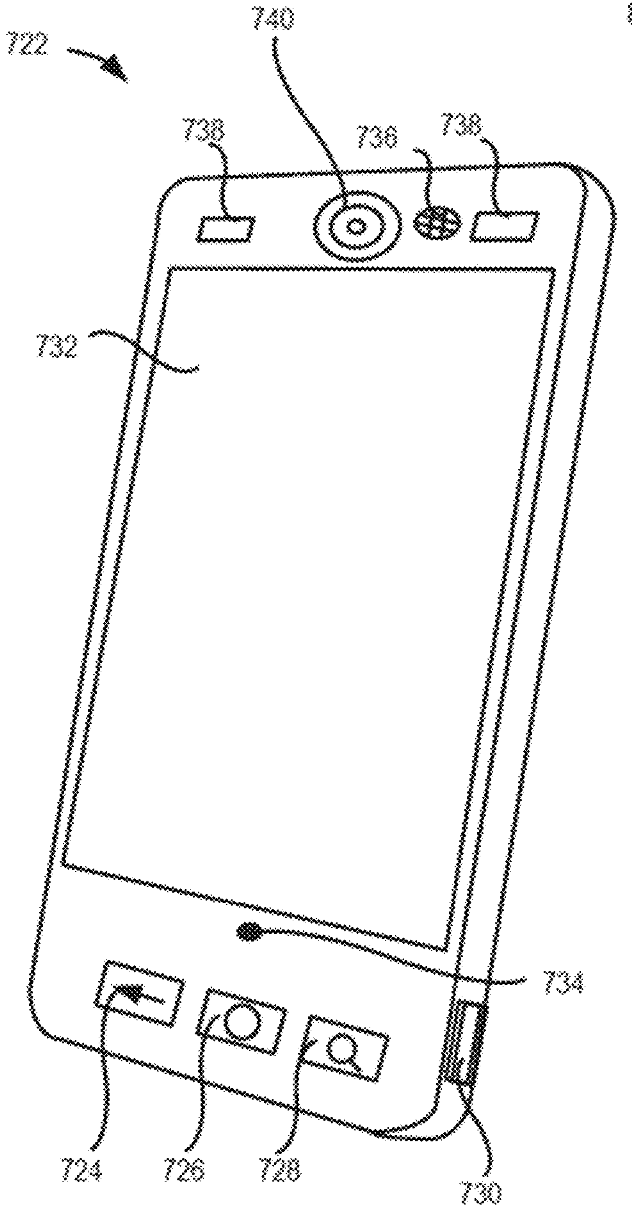
FIGS. 15-16 are block diagrams of a mobile computing device that may be utilized with the system of FIG. 1.
Figure 16:
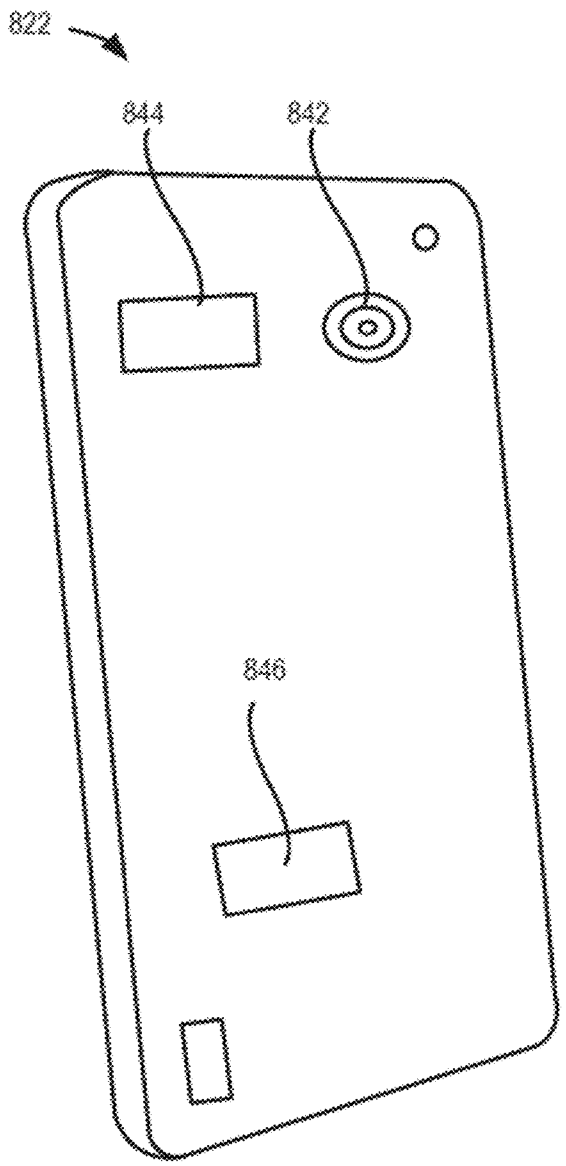

FIG. 15 illustrates a front view of the body of an example mobile device 722, while FIG. 16 depicts a rear view of the mobile device 822. It is understood that the example mobile device 722, 822 of FIGS. 15 and 16, are similar in structure having similar components as discussed with mobile device 600 of FIG. 14. As shown, mobile device 722 may include several input devices hardware buttons, including a "back" button 724, home button 726, search button 728, and camera shutter (image-capture) button 730. Also depicted is touchscreen display 732.

Mobile device 722 may include microphone 734 and speaker 736, along with two proximity sensors 738, situated below the surface of mobile device 722. In some examples, a single, or three or more, proximity sensors may be used. Any suitable proximity sensor(s) may be employed. The front face of mobile device 722 may further include front camera 740. Front camera 740 may be used to capture images or video with an image sensor embedded in mobile device 722 behind a lens. The image sensor may comprise, for example, a CMOS-based sensor, CCD (charge-coupled device) sensor, or other suitable technology.

As shown in the rear view of mobile device 822 shown in FIG. 16, mobile device 822 may include rear camera lens 842 and electronic flash 844. In some examples, there is no flash present in mobile device 822. Rear camera 842 may be configured to capture an image or video with an image sensor embedded in the device behind a lens. The image sensor may be, for example, a CMOS-based sensor, CCD (charge-coupled device) sensor, or other suitable technology.

The individual components (e.g., hardware buttons 724, 726, 728, and 730, microphone 734, speaker 736, touchscreen display 732, rear camera lens 842 and electronic flash 844) may be coupled to a mobile device chassis (not shown), which is connected to internal components of mobile device 822, for example: one or more processors, a piezoelectric actuator, a power supply, and a modem.

As shown, software 846 for implementing embodiments of the described online gaming techniques may be stored on computer-readable storage media (e.g., non-transitory computer-readable storage media) in mobile device 822.

Industrial Applicability, Variations and Alternative Embodiments

In other aspects of the present invention, a hybrid sports betting/casino product where users are able to purchase virtual packs of virtual player cards featuring athletes competing in sports events on a given day and where such cards pay out a specified dollar amount for each stat the player accrues within a defined period (e.g., a day of games).

One aspect of the present disclosure includes sports promo games where users place Single Game Parlay (SGP) bets on a sports game and receive one or more virtual cards featuring a random player playing in a random game from that sport on that day and a badge signifying a prize awarded if that player leads or ties for the league lead in a defined statistical category on that day.

In various embodiments, "PROP Packs" can be a hybrid sports betting/casino product where users are able to purchase packs of player cards featuring athletes competing in sports events on a given day. The cards pay out a specified dollar amount for each stat the player accrues on that day.

The following is an example without vig included in the example; however, it should be clear that a suitable vig can be included in various embodiments. For example, "vig" can refer to the commission or fee that a bookmaker or sportsbook charges for accepting wagers. For example, if you place an even money bet (where the chances of winning are roughly 50/50), you might see odds of −110. This can mean that you need to wager $110 to win $100. The extra $10 represents the vig.

The following is a no-vig example in the example context of the National Basketball Association (NBA); however, further embodiments can relate to any suitable professional, semi-professional or amateur sports league including the National Football League (NFL), National Basketball Association (NBA), Major League Baseball (MLB), National Hockey League (NHL), English Premier League (EPL), La Liga (Spanish football league), Bundesliga (German football league), Serie A (Italian football league), National Collegiate Athletic Association (NCAA) for college sports in the United States, Indian Premier League (IPL) for cricket, National Rugby League (NRL), Formula 1 (F1) for auto racing, National Women's Soccer League (NWSL), Major League Soccer (MLS), Australian Football League (AFL), and the like.

One example can include:

A 10-game NBA slate,

Assume 10 active players per team=200 players total,

Assume average over/under for each game is 200, 2,000 points scored/200 players=10 points scored per player on average, Each PROPPack costs $30 and contains 3 player cards representing active NBA players on that day that payout $1 for each point that player scores Example Pack #1

Dan buys a PROPPack for tonight's games and randomly receives players Durant, Giannis, and Embiid. He's pumped because he's looking at an expected profit of $57 given his players average a total of 87 PPG. Clearly this is a great user experience.

Example Pack #2

Dan buys a PROPPack for tonight's games and randomly receives players Dalano Banton ($4), Jonathan Kuminga ($8), and Blake Griffin ($7). He's looking at an expected loss of $11. This is a poor outcome for Dan. He's bummed because he didn't pull any star players, but these are his guys for tonight, so he does some research. "Damn, Blake's 32 years old? Seems like forever ago he jumped over that Kia."<watches the dunk on YouTube and shares it with his buddy, mentioning that he pulled Blake in a PROPPack> Dan then researches Banton and Kuminga and watches some highlights, learning they're two of the more athletic young players in the league. Fueled by his findings, Dan sits down to watch tonight's games excited by his newly minted interest in these three players, who meant nothing to him prior to today.

Example Monetization and Implementation

In various embodiments, PROPPacks can be monetized by pricing the packs higher than what the expectations are for their actual value. Note that in various embodiments this does not require actually predicting each players' points scored and does not require predicting the over-under in a specific game. In various embodiments, pricing of the pack can be based at least in part on predicted total points scored in the NBA on a given day. In various embodiments, it may not be necessary to monitor or limit users since the product can be 100% chance based. For example, various embodiments can allow for any number of users buying any suitable number of packs.

In various embodiments, PROPPacks can generate interest in players that are less popular overall, or less popular to a given PROPPack buyer, and can increase viewership on low-value games, increase viewership in garbage time of games, and the like.

Multiplier Packs Example

Some embodiments can include an implementation of PROPPacks as discussed herein, but the maximum gross payout for a user can be larger (e.g., about 3× their bet in some examples). Some users may want to play a low-variance style of game, but for users seeking a larger potential payout, packs could be offered which can contain multiplier cards which pay out more than $1 a point (for example: silver cards paying out $3 a point, gold cards $5 a point, and platinum cards $10 a point). These packs can be priced higher than other variations of PROPPacks. Multiplier cards can be randomly distributed among players in some embodiments (e.g., not just for star players).

Example Pack #3

Dan buys a platinum PROPPack for $35 for tonight's games, which contains common, silver, gold, and platinum cards. He pulls a common Al Horford ($10), common Alex Caruso ($8) and platinum Matisse Thybulle (10*$6=$60) for an expected return of $43.

It's official-Dan's new favorite player is Matisse Thybulle and he tweets out his platinum Thybulle card in celebration. In some embodiments, this sort of experience can offer unique brand ambassador promotional opportunities. For example, Thybulle (a Trail Blazers player) could be signed to a promotional deal and the number of platinum Thybulle cards can be increased as part of the promotion (or add a 100× Thybulle multiplier card in some examples) to Oregon PROPPacks, which in some examples can increase fan interest in him as a player. In various embodiments, this can be beneficial for both a provider of PROPPacks and for the player, team or city that is featured in such a promotion.

Pack Opening Experience

As discussed herein, in various embodiments, cards of a pack can be virtual non-physical cards that are presented to a user on an interface (e.g., a screen of a smartphone, laptop computer, tablet computer, television, or the like).

In various embodiments, cards of a pack can be presented to a user in various suitable ways. For example, in some embodiments, a desirable opening experiences provides multiple dopamine hits to the user by revealing a card's value in several steps. In some embodiments, a pack can be represented similar to how physical real-world packs of sports cards are packaged and configured, such as wrapped in a flexible plastic, paper or mylar wrapping that encloses the cards. The exterior of the pack can feature vibrant graphics, branding, and information about the enclosed cards. Upon opening, such as by tearing or cutting the pack wrapping, a set of a plurality of individual sports cards can be revealed, which are typically rectangular or square-shaped made of sturdy materials such as cardboard or plastic. These cards can showcase various athletes, teams, or moments of play, with the front displaying high-quality images, player names, and team logos. FIG. 1 of the attached illustrates an example embodiment of a card. The reverse side of the cards often contains detailed statistics, player information, or trivia about the player or team.

In various embodiments, an animation or other presentation can be configured to emulate the experience of opening a physical pack of sports cards. In some embodiments, virtual cards can have a player name, number, position, and team in the 4 corners of the card, which in some examples can be configured to be revealed one at a time (e.g., to build suspense).

In some embodiments, a virtual pack opening animation can include virtual pack being shown being torn open. For example, in an embodiment, depending on where the user clicks and drags (or touches and drags on mobile) the pack opens in a different manner. For example, clicking, touching, dragging, or the like, can generate virtual tears in the virtual pack such that a user can open a pack in a completely unique way or in one of a plurality of possible ways. In some examples, this can allow users to have their own "lucky" way to open a virtual pack. In some embodiments, an animation camera can pan inside the pack and the cards can be projected out onto the screen without revealing the player on them. The user in some examples can then mouse-over each card and reveal whether each is a multiplier card (e.g., by its color). In some embodiments, if a user clicks on a card, the player's details would be revealed on it one by one: Team, position, number, name, image. Some embodiments can include a stamping animation so it feels like building the card in front of the user.

Some embodiments can expand the pack opening animation options and can enable the user to reveal different parts of the top card based on how they interact with the virtual pack. Once a top card is revealed (e.g., with the other two hidden behind it), a user can be able to slide to reveal the second card, throw all (e.g., three) cards down at once to reveal, and the like.

Post Pack Opening Example

In some embodiments, players acquired from packs can automatically be added to the user's team for a period of time (e.g., for a day of sports games, week of sports games, season of sports games, or the like). In various examples, when the players of a user begin accruing points in their games, the front of the card can list the card's current dollar value, with the value increasing as the player scores points (e.g., $1 per point). In some embodiments, once a final scoring revision is received on a player's game (or for other time period), the final dollar value gained by the card can be deposited into the user's account. User accounts are discussed in more detail herein.

In some embodiments, it can be desirable to allow users to trade virtual cards with each other, to the virtual card provider, or other entities. For example, in some embodiments, a user can have the option to quick-sell their players (e.g., their cards) back to the issuer of the pack of cards post pack opening, or to list the player or card on a peer-to-peer marketplace, or the like.

Such a quick-sell option in some examples can encourage users to get into a cycle where they open a pack, sell players back to the pack/card issuer, and repeat. This can be desirable because it can allow a user to give up cards/players they are not interested in and to potentially obtain cards they are interested in. This can be desirable for the card/pack issuer because they may be able to obtain a vig for both the pack sale and purchase of each player (e.g., via buying the player/card back at a discount to expected value). In some embodiments, offering such an option may require projecting all player point totals for calculating prices of cards, packs, vig, available cards, available packs, and the like. In some embodiments, player identity and other aspects of a card (e.g., multiplier, bonus, or the like) can be traded together (e.g., optionally or necessarily) or can be traded separately.

In some embodiments, a secondary market option for cards/players would allow a vig to be taken on each trade between two users, and in some examples can let users purchase a specific player at market price without having to open a pack. In some embodiments, this can allow a card/pack issuer to offer its users the chance to bet on any player in the league without the card/pack issuer having to actually project each player's output.

Live Viewing Experience Examples

In various embodiments, once games officially begin (e.g., tipoff), a user can be able to click to flip a card over and show all of that player's baskets scored during the game in question, which in various embodiments can be updated in real time as the game progresses (e.g., based on data from a sports data feed). Some embodiments can include a video or image clip of the points being scored taken from the video or images from the real sports game.

In some embodiments, all users who hold a specific player/card would be able to chat with each other on the card back. In various examples, this can allow all people who are holding a player to root for him together.

In some embodiments, users can be able to apply in-game power ups to their players/cards that apply a multiplier to points/dollars accrued (e.g., over the next x minutes or in another suitable way), and/or cross-sell users' sports bets associated with the teams their players are playing for (e.g., since they're already watching those games).

Other Sports and Scoring Examples

While the NBA is used as one example herein, such a virtual card system and method can be applied to any other suitable sports or leagues. In various embodiments, suitable scoring metrics can include one or more of yards gained, touchdowns, field goals, sacks, goals, points, assists, steals, tackles, strikeouts, home runs, stolen bases, for all games in a given day or other time period (e.g., week, season, or the like). In some embodiments, a Daily Fantasy Sports (DFS) scoring system can be used for a given sport, which in some examples can be based on the metric for gaining points or money for virtual cards. Sports betting systems and methods are discussed in more detail herein.

In some embodiments, a DFS-style scoring system can include multipliers on individual stats. In some embodiments, this can be indicated on cards with badges, colors indicating the level of multiplier, and the like. For example, a platinum pick-pocket badge that boosts an NBA player's dollar per steal value by 10×.

Multi-Day PROPPacks Examples

While some embodiments discussed herein relate to single-day PROPPacks, in further embodiments PROPPacks and/or virtual cards can be offered on a weekly, monthly, season-long, or career-long basis. For example, cards can be active during a given player's career at a given team or their entire career within a given league or their entire career between a plurality of leagues (e.g., NCAA and NFL). In various embodiments, such PROPPacks and/or virtual cards can be traded among users and/or card providers as discussed herein.

Season PROPPacks Example

Thybulle has 21 games remaining this year and has averaged 4.7 PPG. In a world with no games missed and future expected production equal to his current season production (and ignoring the time value of money) his card would trade at $98.70 in one example. If I bought his card and he rattled off five 20-point games in a row, I would be up $100-$98.70=$1.30 on my investment already via dividends received, and my Thybulle card would now be trading at 16 games remaining times his per game expectation (assume 10 PPG given his hot streak), or $160, for another $160-$98.70 in paper profits I could recognize by selling his player card.

Career PROPPacks Example

Taking and expanding the above example into further examples, Career PROPPacks and/or a secondary market can exist where player cards trade at (e.g., roughly) the present value of the player's future points scored over the remainder of their career, with dividends issued to their owner as they score points.

NFT Example

In some examples, PROPPacks (e.g., day, week, month, career or season) can fit into a Non-Fungible Token (NFT) structure, which can be desirable in examples where the cards retain their core economic value for more than one day. They can also provide their owner collectible value during and after their dividend-paying period (e.g., a Lebron James career card could be sought after even post-retirement), while not relying on the collectability feature as the sole determinant of their value.

Card-Based Promo Games Examples

Various embodiments can include sports promo games (e.g., for basketball, football, and hockey) where users place Single Game Parlay (SGP) bets on a sports game and receive cards featuring one or more of: a random player playing in a random game (not necessarily the game the user bet on) from that sport on that day and/or a colored badge signifying a prize if that player leads or ties for the league lead in a key statistical category on that day. In various examples, a Single Game Parlay (SGP) can be a type of bet where a user makes multiple selections as part of a single wager, and for the bet to win, all selections within the parlay must be correct.

In various embodiments, a Single Game Parlay (SGP) is a wager that combines multiple bets, or "legs," within a single game. One aspect of an SGP can be that all the bets are centered around one event (e.g., a sporting event), unlike traditional parlays which can span multiple games or events. In various embodiments, the bets within an SGP can include point spreads, player stats, team stats, and the like, as long as such bets are all within the same game. The potential payout for an SGP can be calculated by multiplying the odds of each individual leg. However, in order for the parlay to win, in various examples each individual bet within the parlay must be correct and if one bet is wrong, the entire parlay is lost.

For example, if there is a football game between Team A and Team B, a user can decide to create an SGP with the following three legs: Team A will win; The total score will be over 50 points; and Player X will score a touchdown. If all three of these outcomes happen, the user wins the SGP bet. However, if one or more of these outcomes does not happen (for example, if Team A wins and Player X scores a touchdown, but the total score is under 50 points), then the SGP bet is lost.

While examples using an SGP are provided herein, it should be clear that further embodiments can relate to any suitable sports betting, non-sports betting, or non-betting applications, so the examples herein should not be construed as being limiting.

Card Issuance Logistics Example

In an embodiment, users receive their first card by betting $10 in SGPs on a game, their second at $25, and their third and final card at $50. Players earn additional cards by betting on more games. Cards in some examples can feature players from upcoming, in progress, or completed matches. If the player's game has not started yet, in some embodiments we will reveal only their team while we wait for that game's lineups to be confirmed. Doing so can be desirable because it can give the card provider an opportunity to contact the user and get them back on their app for the player reveal.

NBA Sharpshooter Example

Universe of Players: Starters (10 players/game)
Statistical Category: Points
Win Frequency: 1.43%
Card Cost: $0.74
Promo Cost: $428,287/2.1% of SGP handle
Value Back to Player: $10:7.4%| $25:5.9%| $50:4.5%

| Badge | Prize (Cost) | Frequency | EV | Payouts Per Year |
|---|---|---|---|---|
| Diamond | $10,000 Bonus Funds | 0.15% | $15.00 | 12 |
| Platinum | $1,000 Bonus Funds | 1.5% | $15.00 | 124 |
| Gold | $100 Bonus Bet ($65) | 10% | $6.50 | 825 |
| Silver | $50 Bonus Bet ($32.50) | 20% | $6.50 | 1,651 |
| Bronze | $20 Bonus Bet ($13) | 68.4% | $8.89 | 5,642 |
| Total | | | $51.89 | 8,254 |

Example: Eight NBA games were played on Nov. 20, 2022, featuring 80 starting players. A user who placed a $10 or greater SGP on one of those games could have received one of the following randomly selected cards:

| Player | Badge | Prize | 2022 PPG |
|---|---|---|---|
| Kelly McMaster | Silver | $50 | 20.3 |
| Kelly Green | Bronze | $20 | 12.4 |
| Jack Bridges | Bronze | $20 | 20.1 |
| Jeffrey Smith | Bronze | $20 | 12.8 |
| Bobby McPhee | Bronze | $20 | 29.1 |

In this example, three of these cards have a great shot at winning, and many users could convince themselves that all five are worth a sweat. In 2022-23, the average starting player scored the most points in the league 1.43% of the time. In this example, this represents the win rate for a single card and means that users who place $50 or more in SGPs on a game and receive three cards would receive a winning card 4.23% of the time.

MLB Hitman Example

Some embodiments can use either hits or home runs for a baseball promo game; however, any suitable statistic can be used in further embodiments. Most days, it takes 2+ HR and 4+ hits to lead the league. In some examples, hits can be a desirable statistic to use because users can perceive that the probability of a random MLB player leading the league in home runs is longer than the odds of one recording the most hits when the opposite can be true due to all the ties.

Universe of Players: Starting lineup (18 players per game)
Statistical Category: Hits
Win Frequency: 0.94% (2.37% for HR)
Card Cost: $0.77
Promo Cost: $364,152/2.1% of SGP handle
Value Back to Player: $10:7.7%| $25:6.1%| $50:4.6%

| Badge | Prize (Cost) | Frequency | EV | Payouts Per Year |
|---|---|---|---|---|
| Diamond | $10,000 Bonus Funds | 0.3% | $30 | 13 |

-continued

| Badge | Prize (Cost) | Frequency | EV | Payouts Per Year |
|---|---|---|---|---|
| Platinum | $1,000 Bonus Funds | 3.0% | $30 | 134 |
| Gold | $100 Bonus Bet ($65) | 10% | $6.50 | 446 |
| Silver | $50 Bonus Bet ($32.50) | 20% | $6.50 | 892 |
| Bronze | $20 Bonus Bet ($13) | 66.7% | $8.67 | 2,974 |
| Total | | | $81.67 | 4,459 |

Example: There were 15 MLB games played on Oct. 1, 2023, featuring 270 starting players. A user who placed a $10 or greater SGP on one of those games could have received one of the following randomly selected cards:

| Player | Badge | Prize | 2023 BA | 2023 HR |
|---|---|---|---|---|
| Michael Rodgers | Bronze | $20 | .258 | 4 |
| Marc Smith | Bronze | $20 | .274 | 40 |
| Oliver Heif | Silver | $50 | .263 | 12 |
| Juan Smith | Bronze | $20 | .289 | 15 |
| Donovan Harris | Bronze | $20 | .282 | 5 |

All these players are reasonable options to record the most hits on a given day, but only three of them are a reasonable bet to record the most home runs.

NHL Sniper Example

The following example uses points as a statistical category, but any suitable statistic or other metric can be used in other examples (e.g., goals).

- Universe of Players: Top 3 forward lines and top 2 defense pairings (26 players)
- Statistical Category: Points
- Win Frequency: 1.43%
- Card Cost: $0.74
- Promo Cost: $93,649/2.2% of SGP handle
- Value Back to Player: $10:7.4%| $25:5.9%| $50:4.4%

| Badge | Prize (Cost) | Frequency | EV | Payouts Per Year |
|---|---|---|---|---|
| Platinum | $1,000 Bonus Funds | 3.0% | $30 | 54 |
| Gold | $100 Bonus Bet ($65) | 10% | $6.50 | 181 |
| Silver | $50 Bonus Bet ($32.50) | 20% | $6.50 | 362 |
| Bronze | $20 Bonus Bet ($13) | 67% | $8.71 | 1,213 |
| Total | | | $51.71 | 1,811 |

Example: Six NHL games were played on Oct. 11, 2023, featuring 216 starting players (12 forwards and six defensemen per team). Similar to the NBA Sharpshooter example, where we issue cards featuring only starters, various embodiments can limit Sniper to players on the top three forward lines or top two defensive pairings. A user who placed a $10 or greater SGP on one of those games could have received one of the following randomly selected cards:

| Player | Badge | Prize | 2023 Points |
|---|---|---|---|
| Nathan Hall | Bronze | $20 | 111 |
| Taylor Smith | Bronze | $20 | 36 |
| Andrei Oligath | Bronze | $20 | 74 |
| James Green | Platinum | $1,000 | 12 |
| Kyle Rachel | Silver | $50 | 80 |

This user has a great shot at winning with four of their five cards. They also have a hilarious sweat of James Green's game, winning $1 k if he happens to have the game of his life (which he did on Oct. 15, 2022, leading the league with 3 points).

Additional Example Embodiments

While various examples discussed herein relate to a user receiving a virtual pack or set of three virtual cards (e.g., buying or receiving as a bonus), further embodiments can include receiving any suitable number of virtual cards in a virtual pack or set, including 1, 2, 3, 4, 5, 6, 7, 8, 9, 10, 15, 25, 50, 100, 250, 500, 1000, 5000, 10000 and the like.

Some embodiments can include using fantasy point totals (e.g., 6 points for a goal, 4 points for an assist, 1 point for a shot on goal (SOG), and the like) as the statistical metric for the examples discussed herein. In various embodiments, Daily Fantasy Sports (DFS) is a type of online game where participants assemble virtual teams of real players of a professional sport. These virtual teams compete based on the statistical performance of those players in actual games. This performance can then be converted into points that are compiled and totaled according to a roster selected by each fantasy team's manager. The game can be structured in a way that allows multiple competitions to be held over short-term periods, such as a week or a day, hence the term "daily." DFS can be different from traditional fantasy sports where the competition can last an entire season. Participants in DFS can enter contests and win money based on their skill in selecting players who perform well in their respective roles.

In some embodiments, available cards can include all players dressed for a specific game and not just starters.

Some embodiments can include not awarding cards featuring players from completed games.

Some embodiments can include restricting player cards issued to users to one or more game that the user has bet on.

In the playoffs of various sports and in various examples, there is only one game per day, which can change how generation of cards and/or packs is done. For example, some embodiments can include one or more of the following:

- Reduce the frequency of the larger prizes such that the odds of winning, for example, $10 k is the same as on a typical regular season game.
- Increase the universe of available players to all that dress for the game.
- Reduce the dollar amount associated with the larger prizes.
- Increase the promotional budget to accommodate the increased win rate.

MLB Cycle Example

Place $10, $25, or $50 in SGPs on a game and receive one, two, or three random cards featuring players in the starting lineup of games on that day.

If your player hits for the cycle on that day, you win the grand prize, with smaller prizes issued for players who complete three legs of a cycle.

A random player will hit for the cycle 0.01% of the time and record three and two legs of a cycle 1.4% and 12.9% of the time, respectively.

NHL Golden Goal

Place $10, $25, or $50 in SGPs on a game and receive one, two, or three random cards featuring skaters in the starting lineup of games on that day. If one of your players scores, you win a $10 free bet. If two score, you win a $50 free bet. If all three score, you win a $500 free bet. Users can be incentivized to bet enough to receive three cards, which can be the only way to win the top prize in some embodiments.

NHL Tic Tac Toe Example

Place $10, $25, or $50 in SGPs on a game and receive a three-by-three bingo card featuring nine NHL players in the starting lineup of games on that day. Players who score goals are marked with an X on the bingo card. Prizes are awarded based on how many lines you make on your bingo card, with the grand prize awarded for "full cards."

NBA Sharpshooter Example (Points Scored Thresholds)

Place $10, $25, or $50 in SGPs on a game and receive one, two, or three random cards featuring players in the starting lineup of games on that day. You win the grand prize if your player(s) score(s) 50 or more points and smaller prizes if your player(s) score(s) 40, 30, or 20 points.

MLB Hitman Example

Some embodiments may include a badge in sportsbook indicating Hitman is available for that game. In some embodiments, such a badge can be blue if the user has not received a card on that game, yellow if they have. Onclick blue badge can open a rules modal and onclick yellow badge can open an MLB Hitman Modal. In various embodiments, when a qualifying bet is placed, Card Award Popup can be opened.

Card Award Popup

Some embodiments can include one or more of the following features: if player game has not started yet, but we have lineups, show player and AVG; if player game has started or completed show hits; if player game has not started, and we do not have lineups yet, show only team and prize, with player revealed once lineups are available.

Hitman Modal: Games Live

Some embodiments can include one or more of the following features: swipe to view all user's player cards, most hits to least; show inning/opponent on card; when no games are active yet, show AVG leaders; if the card player's game is upcoming, show his AVG instead of hits.

Throughout this disclosure there are references to "disclosed embodiments," which refer to examples of inventive ideas, concepts, or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium and systems and devices for implementing those methods via, for example, at least one processor. It is to be understood that this form of disclosure is for case of discussion only, and one or more aspects of one embodiment herein may be combined with one or more aspects of other embodiments herein, within the intended scope of this disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

While example embodiments have been described, it is to be understood that the words which have been used are words of description rather than limitation and that changes may be made within the purview of the appended claims without departing from the true scope and spirit of its broader aspects.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A user interface component installed on a user device and configured to allow a user to interact with a virtual player card, the virtual player card having a randomly selected player selected from a plurality of available players, a level randomly selected from a plurality of available levels and a player card award, the user interface component including:

a plurality of user inputs; and a display screen, the user inputs and display screen forming a user interface, the user interface being configured to displaying a graphical representation of the virtual player card on the display screen of the user interface, the graphical representation having a first mode and a second mode, wherein the player, level and player card award are hidden in the first mode and the player, level and player card award are visible in the second mode, the user interface configured to perform the steps of:

displaying the graphical representation of the virtual player card in the first mode;

detecting actuation of one of the user inputs by the user; and, animating, in response to detecting actuation of one of the user inputs by the user, the graphical representation to reveal the second mode.

2. A method associated with an interface component installed on a user device and configured to allow a user to interact with a virtual player card having a randomly selected player selected from a plurality of available players, a level randomly selected from a plurality of available levels and a player card award, the user interface component including a plurality of user inputs and a display screen forming a user interface, the user interface configured to perform the steps of:

displaying a graphical representation of the virtual player card on the display screen in a first mode, wherein the player, level and player card award are hidden in the first mode;

detecting actuation of one of the user inputs by the user; and, animating, in response to detecting actuation of one of the user inputs by the user, the graphical representation to reveal a second mode, wherein the player, level and player card award are visible in the second mode.

3. A system, comprising:

a user interface component installed on a user device and configured to provide a user interface, the user interface including a plurality of user inputs and a display screen; and, at least one server in communication with the user interface component and including one or more processors and a memory device for storing computer instructions, the one or more processors configured to execute the computer instructions to perform the steps of:

generating a virtual player card, the virtual player card having an associated target statistic and a base award, the virtual player card being generated by performing the steps of:

randomly selecting a player from a plurality of available players;

randomly selecting a level from a plurality of predetermined levels;

establishing a player card award as a function of the randomly selected level; and, assigning the randomly selected player, the randomly determined level and the player card award to the virtual player card; and, storing the virtual player card in the memory device;

providing the virtual player card to a user associated with the user device; and, displaying a graphical representation of the virtual player card on the display screen of the user interface, the graphical representation having a first mode and a second mode, wherein the player, level and player card award are hidden in the first mode and the player, level and player card award are visible in the second mode, wherein the step of displaying a graphical representation of the virtual player on the display screen of the user interface includes the steps of:

displaying the graphical representation of the virtual player card in the first mode;

detecting actuation of one of the user inputs by the user; and, animating, in response to detecting actuation of one of the user inputs by the user, the graphical representation to reveal the second mode.

4. The system, as set forth in claim 3, wherein the virtual player card has an associated term, the one or more processors are further configured to compare the associated target statistic of the virtual player card with the associated player's actual statistics over the associated term and provide the user with the player card award as a function of the associated player's actual statistic.

5. The system, as set forth in claim 4, where the player card award is awarded if the player's actual statistic exceeds the associated target statistic of the virtual player card.

6. The system, as set forth in claim 4, wherein the base awarded is added to the player card award for each instance of the target statistic.

7. The system, as set forth in claim 4, wherein the term is one of a single game, a predetermined number of games, a time period, a series of games, a season, or a career.

8. The system, as set forth in claim 3, wherein the step of generating a virtual player card further includes the step of randomly selecting the associated target statistic from a set of available statistics.

9. The system, as set forth in claim 3, wherein the associated target statistic is a combination statistic determined as a function of two or more underlying statistics.

10. The system, as set forth in claim 3, wherein each player in the plurality of available players has an equal probability of being selected.

11. The system, as set forth in claim 3, where each level in the plurality of predetermined levels has a weighted probability, wherein levels with a lower probability results in a higher player card award.

12. The system, as set forth in claim 3, wherein the user inputs includes touchscreen inputs, wherein the actuation of one of the user inputs is one or more of a touch, click or drag motion by the user.

13. The system, as set forth in claim 12, wherein the first mode of the graphical representation of the virtual interface includes a virtual package, wherein the virtual player card is within the virtual package.

14. The system, as set forth in claim 13, wherein the step of animating the graphical representation to reveal the second mode, includes an animation illustrating opening of the virtual package.

15. The system, as set forth in claim 14, wherein the animation illustrating opening of the virtual package is dependent on a location and/or direction of user actuation of one of the touchscreen inputs.

16. The system, as set forth in claim 13, wherein the virtual package includes a plurality of virtual player cards.

17. The system, as set forth in claim 3, wherein the virtual player card may be listed and traded on a virtual market.

18. A method performed, at least in part, by at least one server having one or more processors and a memory device for storing computer instructions, including the steps of:

providing a user interface component installed on a user device and configured to provide a user interface, the user interface including a plurality of user inputs and a display screen; and, generating, by the at least one sever, a virtual player card, the virtual player card having an associated target statistic and a base award, the virtual player card being generated by performing the steps of:

randomly selecting a player from a plurality of available players;

randomly selecting a level from a plurality of predetermined levels;

establishing a player card award as a function of the randomly selected level; and, assigning the randomly selected player, the randomly determined level and the player card award to the virtual player card;

storing the virtual player card in the memory device;

providing the virtual player card to a user associated with the user device; and, displaying a graphical representation of the virtual player card on the display screen of the user interface, the graphical representation having a first mode and a second mode, wherein the player, level and player card award are hidden in the first mode and the player, level and player card award are visible in the second mode, wherein the step of displaying a graphical representation of the virtual player on the display screen of the user interface includes the steps of:

displaying the graphical representation of the virtual player card in the first mode;

detecting actuation of one of the user inputs by the user; and, animating, in response to detecting actuation of one of the user inputs by the user, the graphical representation to reveal the second mode.

19. The method, as set forth in claim 18, wherein the virtual player card has an associated term, the one or more processors are further configured to compare the associated target statistic of the virtual player card with the associated player's actual statistics over the associated term and provide the user with the player card award as a function of the associated player's actual statistic.

20. The method, as set forth in claim 19, where the player card award is awarded if the player's actual statistic exceeds the associated target statistic of the virtual player card.

21. The method, as set forth in claim 18, wherein the base awarded is added to the player card award for each instance of the target statistic.

22. The method, as set forth in claim 18, wherein the term is one of a single game, a predetermined number of games, a time period, a series of games, a season, or a career.

23. The method, as set forth in claim 18, wherein the step of generating a virtual player card further includes the step of randomly selecting the associated target statistic from a set of available statistics.

24. The method, as set forth in claim 18, wherein the associated target statistic is a combination statistic determined as a function of two or more underlying statistics.

25. The method, as set forth in claim 18, wherein each player in the plurality of available players has an equal probability of being selected.

26. The method, as set forth in claim 18, where each level in the plurality of predetermined levels has a weighted probability, wherein levels with a lower probability results in a higher player card award.

27. The method, as set forth in claim 18, wherein the user inputs includes touchscreen inputs, wherein the actuation of one of the user inputs is one or more of a touch, click or drag motion by the user.

28. The method, as set forth in claim 27, wherein the first mode of the graphical representation of the virtual interface includes a virtual package, wherein the virtual player card is within the virtual package.

29. The method, as set forth in claim 28, wherein the step of animating the graphical representation to reveal the second mode, includes an animation illustrating opening of the virtual package.

30. The method, as set forth in claim 29, wherein the animation illustrating opening of the virtual package is dependent on a location and/or direction of user actuation of one of the touchscreen inputs.

31. The method, as set forth in claim 28, wherein the virtual package includes a plurality of virtual player cards.

32. The method, as set forth in claim 18, wherein the virtual player card may be listed and traded on a virtual market.

* * * * *